(12) United States Patent
Dateki

(10) Patent No.: US 8,665,832 B2
(45) Date of Patent: Mar. 4, 2014

(54) DEVICE, CHANNEL QUALITY ESTIMATION METHOD, AND TRANSMISSION METHOD

(75) Inventor: Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 198 days.

(21) Appl. No.: 13/169,660

(22) Filed: Jun. 27, 2011

(65) Prior Publication Data
US 2011/0255584 A1 Oct. 20, 2011

Related U.S. Application Data

(63) Continuation of application No. PCT/JP2009/050379, filed on Jan. 14, 2009.

(51) Int. Cl.
*H04W 4/00* (2009.01)
*H04W 72/08* (2009.01)
*H04W 72/04* (2009.01)

(52) U.S. Cl.
CPC ........ *H04W 72/085* (2013.01); *H04W 72/0413* (2013.01)
USPC .......................................... 370/332; 370/210

(58) Field of Classification Search
CPC .................................................. H04W 72/085
USPC ................................... 370/332, 210; 375/146
See application file for complete search history.

(56) References Cited

U.S. PATENT DOCUMENTS

| 2002/0034967 | A1 | 3/2002 | Taniguchi et al. | |
|---|---|---|---|---|
| 2004/0022213 | A1 * | 2/2004 | Choi et al. | 370/332 |
| 2008/0107158 | A1 * | 5/2008 | Yoshii et al. | 375/146 |
| 2008/0232240 | A1 * | 9/2008 | Baum et al. | 370/210 |
| 2009/0141841 | A1 | 6/2009 | Dateki | |

FOREIGN PATENT DOCUMENTS

| JP | HEI09-238105 | 9/1997 |
|---|---|---|
| JP | 2002-094448 | 3/2002 |
| JP | 2006-279635 | 10/2006 |
| WO | 2006/049282 | 5/2006 |
| WO | 2008/012967 | 1/2008 |

OTHER PUBLICATIONS

International Search Report issued for corresponding International Patent Application No. PCT/JP20091050379, mailed Apr. 21, 2009.
NTT DoCoMo; "Physical Channel Structures for Evolved UTRA", R1-050464; 3GPP TSG RAN WG1 Meeting #41, 2005.05. pp. 1-13. [Ref.: ISR mailed Apr. 21 2009].

(Continued)

*Primary Examiner* — Wei Zhao
(74) *Attorney, Agent, or Firm* — Myers Wolin, LLC

(57) ABSTRACT

A mobile device includes a first receiving unit that receives a dedicated pilot signal included in a dedicated pilot signal part of a data unit that is transmitted from a base station to the self-device, an second receiving unit that receives a signal included in a dedicated pilot signal part of a data unit that is transmitted from the base station to the other device other than the self-device, a CQI generating unit that estimates a channel quality indicator that indicates a reception environment when the self-device receives data on the basis of the dedicated pilot signal received by the first receiving unit and the signal received by the second receiving unit, and a radio unit that transmits the channel quality indicator estimated by the CQI generating unit to the base station. Therefore, the present invention can contribute to the assignment optimization of a radio resource of the base station.

11 Claims, 17 Drawing Sheets

(56) References Cited

OTHER PUBLICATIONS

Zhong-Hai Han et al.; "Opportunistic Scheduling with Partial Channel Information in OFDMA/FDD Systems" IEEE, 2004. [pp. 511-514].

Dateki et al., Fujitsu Labs Ltd.; "New OFDM Channel Estimation Method by Adding a Virtual Channel Frequency Response"; IEEE 2006.

Motorola; "Dedicated Reference Symbol CQI Generation"; 3GPP TSG RAN1 #51, R1-074575; Jeju, Korea, Nov. 5-9, 2007.

3GPP TS 36.211 V8.3.0; 3rd Generation Partnership Project; Technical Specification Group Radio Access Network; "Evolved Universal Terrestrial Radio Access (E-UTRA); Physical Channels and Modulation", (Release 8); May 2008. [pp. 1-77].

3GPP TS 36.121 V8.3.0; 3rd Generation Partnership Project; Technical Specification Group Radio Access Network; "Evolved Universal Terrestrial Radio Access (E-UTRA); Multiplexing and channel coding", (Release 8); May 2008. [pp. 1-48].

Motorola; "Comparison of MIMO and Beamforming Performance"; 3GPP TSG RAN1#50b, R1-073982; Shanghai, China, Oct. 8-12, 2007. [pp. 1-9].

\* cited by examiner

| MCS | MODULATION METHOD | ENCODING RATIO |
|---|---|---|
| 1 | QPSK | 0.076172 |
| 2 | QPSK | 0.117188 |
| 3 | QPSK | 0.188477 |
| 4 | QPSK | 0.300781 |
| 5 | QPSK | 0.438477 |
| 6 | QPSK | 0.587891 |
| 7 | 16QAM | 0.369141 |
| 8 | 16QAM | 0.478516 |
| 9 | 16QAM | 0.601563 |
| 10 | 64QAM | 0.455078 |
| 11 | 64QAM | 0.553711 |
| 12 | 64QAM | 0.650391 |
| 13 | 64QAM | 0.753906 |
| 14 | 64QAM | 0.852539 |
| 15 | 64QAM | 0.925781 |

| CQI | $\gamma$ [dB] |
|---|---|
| 0 | $\gamma < TH(0)$ |
| 1 | $TH[1] \leqq \gamma < TH[2]$ |
| 2 | $TH[2] \leqq \gamma < TH[3]$ |
| 3 | $TH[3] \leqq \gamma < TH[4]$ |
| ⋮ | ⋮ |
| 15 | $TH[15] \leqq \gamma$ |

FIG.14

| FLAG (N BITS) =010⋯01 | CQI(k=1) | CQI(k=3) | ⋯ | CQI(k=N) |

FIG.15

| FLAG (N BITS) | CQI(k=1) | CQI(k=2) | ⋯ | CQI(k=N) |

| VCQI_av | CCQI_av | FLAG (M BITS) | k(1) | CQI(k(1)) | k(2) | CQI(k(2)) | ... | k(M) | CQI(k(M)) |

DEVICE, CHANNEL QUALITY ESTIMATION METHOD, AND TRANSMISSION METHOD

CROSS-REFERENCE TO RELATED APPLICATION

This application is a continuation of International Application No. PCT/JP2009/050379, filed on Jan. 14, 2009, the entire contents of which are incorporated herein by reference.

FIELD

The embodiments discussed herein are directed to a device, a channel quality estimation method, and a transmission method.

BACKGROUND

Orthogonal frequency division multiplexing (OFDM) in which a plurality of subcarriers can be effectively used has been recently studied for a large number of radio communication systems. An OFDM radio resource is indicated with a plurality of subcarriers and an OFDM symbol indicative of a communication unit time.

A base station of a radio communication system that employs OFDM assigns a subcarrier of an OFDM symbol to data for a mobile device. A computation method for assigning a subcarrier to the data includes, for example, MAX-CI and proportional fair. The base station optimally assigns a subcarrier for each mobile device in consideration of a reception environment for each mobile device to realize an effective use of a plurality of subcarriers.

Moreover, the base station performs a control (hereinafter, "AMC (adaptive modulation and coding) control") for dynamically changing a modulation method of data that is used for transmitting data for a mobile device, an encoding ratio of an FEC (forward error correction) code, and the like. For example, the base station determines a combination (hereinafter, "MCS (modulation and coding scheme)") of the modulation method and encoding ratio of data in accordance with a reception environment for each mobile device in order to perform optimum data transmission.

In a technique for performing the assignment of a subcarrier and the determination of MCS, it is important that a base station correctly grasps a reception environment for each mobile device to realize preferable performance. In order that the base station grasps a reception environment for each mobile device, it is generally known that a mobile device feeds back a channel quality indicator (hereinafter, "CQI") indicating its reception environment to the base station. In other words, it is disclosed that the mobile device estimates a variation of the amplitude and phase in a channel and generates CQI by using a pilot signal transmitted from the base station and feeds back the generated CQI to the base station, and the base station performs an AMC control based on the CQI fed back from the mobile device.

In this case, a pilot signal includes a common pilot signal transmitted independently of the presence or absence of data for each mobile device assigned to a plurality of subcarriers and a dedicated pilot signal transmitted along with data transmission from a base station to a specific mobile device. It is disclosed that the mobile device generates CQI for each subcarrier by using the common pilot signal and feeds back the generated CQIs to the base station and that the mobile device selects subcarriers having good reception environment among the generated CQIs and feeds back the selected subcarriers to the base station.

On the other hand, there is proposed a technique for applying a dedicated pilot signal transmitted by the base station in addition to data for the mobile device to beam forming transmitted by different directivity for each mobile device. Beam forming is a technique that a base station forms a directional beam for a mobile device that is a transmission destination by using a plurality of antennas and adjusts directivity to increase the received power of the mobile device.

It is disclosed that a mobile device generates CQI by using a dedicated pilot signal associated with data for itself when applying the beam forming.

Moreover, it is disclosed that a base station previously transmits a dedicated pilot signal inherent in a mobile device to all subcarriers to first assign packet data to a radio resource and feeds back CQI generated on the basis of the dedicated pilot signal for each mobile device.

Furthermore, it is disclosed that a mobile device gathers, for a long time, offsets that indicate a difference between CQI generated by using a dedicated pilot signal associated with data for itself and CQI generated by using a common pilot signal to compute an average value and generates CQI that indicates an instantaneous reception environment on the basis of the computed average value and CQI generated by using an instantaneous common pilot signal.

SUMMARY

According to an aspect of an embodiment of the invention, a device includes a first receiving unit that receives a dedicated pilot signal included in a dedicated pilot signal part of a data unit that is transmitted from a transmitter to the self-device; a second receiving unit that receives a signal included in a dedicated pilot signal part of a data unit that is transmitted from the transmitter to another device other than the self-device; an estimating unit that estimates a channel quality indicator that indicates a reception environment when the self-device receives data on the basis of the dedicated pilot signal received by the first receiving unit and the signal received by the second receiving unit; and a transmitting unit that transmits the channel quality indicator estimated by the estimating unit to the transmitter.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 14 is a diagram illustrating an example configuration of feedback information (alternative example 1-1);

FIG. 15 is a diagram illustrating an example configuration of feedback information (alternative example 1-2);

DESCRIPTION OF EMBODIMENTS

Regarding the disclosed technique described above, there is a problem in that because CQI generated by a mobile device by using a common pilot signal or a dedicated pilot signal is not CQI according to a reception environment during communication of the mobile device, a base station may not acquire CQI according to a reception environment during communication of the mobile device and thus may not perform the determination of optimum MCS and the assignment of an optimum radio resource by using CQI. In other words, when CQI is generated by using a dedicated pilot signal, the mobile device can estimate only the quality of the reception environment of the subcarrier assigned to itself because the dedicated pilot signal is a signal inherent in the mobile device. Therefore, because the mobile device may not estimate the quality of the reception environment for itself by using another subcarrier, the base station may not assign a radio resource most suitable for the mobile device.

Figure 30:
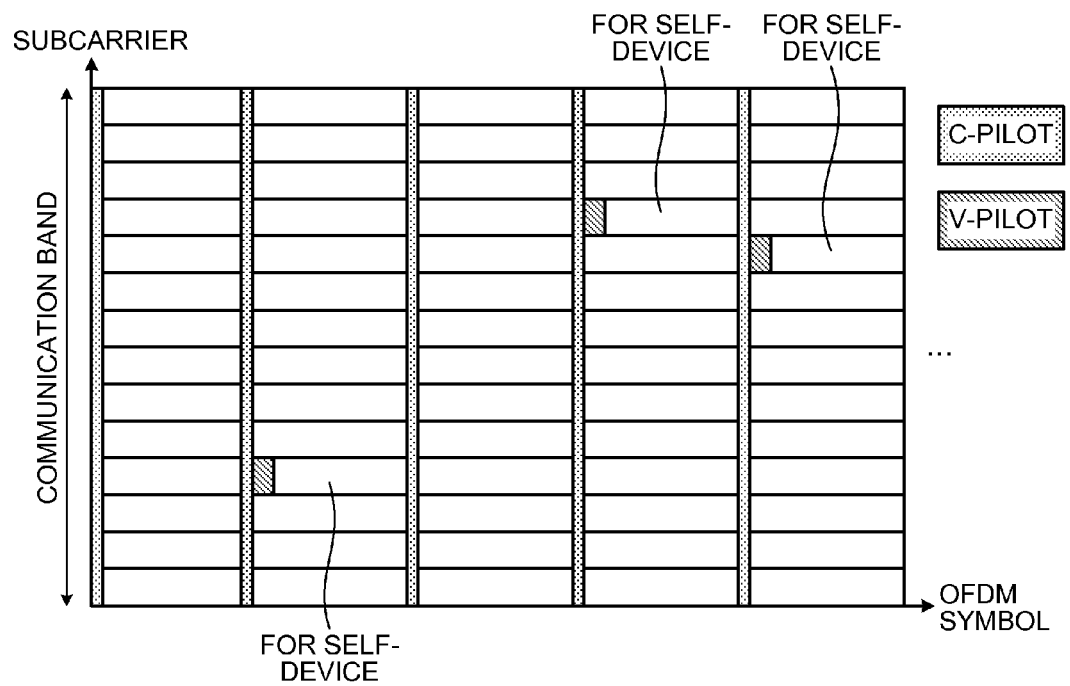
FIG. 30 is a diagram illustrating transmission states of a common pilot and a dedicated pilot.

A specific example will be explained with reference to FIG. 30. FIG. 30 is a diagram illustrating transmission states of a common pilot and a dedicated pilot that can be recognized from one mobile device when a base station transmits data to a plurality of mobile devices. As illustrated in FIG. 30, a horizontal axis indicates an OFDM symbol and a vertical axis indicates a subcarrier. All the subcarriers of the first of a plurality of OFDM symbols have a common pilot signal ("C-pilot" in the diagram) superimposed thereon and a part of the plurality of subcarriers of the second symbol has a dedicated pilot signal ("V-pilot" in the diagram) of one mobile device superimposed thereon. In other words, because a dedicated pilot signal is a signal inherent in a mobile device even if data is transmitted from a base station to mobile devices, only the dedicated pilot signal for itself can be recognized and dedicated pilot signals for the other devices may not be grasped. As a result, each the mobile device can feed back only CQI based on its own subcarrier of the plurality of subcarriers to the base station. Therefore, the base station may not find a better reception environment for each the mobile device and may not assign an optimum radio resource.

Because a propagation path of a common pilot signal and a propagation path of data with a dedicated pilot signal are different when CQI is generated by using a common pilot signal, the mobile device has different reception environments for itself and thus the base station may not assign a radio resource most suitable for the mobile device. Particularly, because the base station transmits data with a dedicated pilot signal in different directions for the mobile devices in the radio communication system to which beam forming is applied, propagation paths of the data and the common pilot signal are different. Therefore, even if CQI is generated by using the common pilot signal, the base station may not assign an optimum radio resource to each mobile device.

Furthermore, because CQI is generated by using a long-term offset when the mobile device generates CQI by using a dedicated pilot signal and a common pilot signal, the generated CQI is not necessarily identical with an instantaneous reception environment. Therefore, the base station may not assign an optimum radio resource.

Preferred embodiments of the present invention will be explained with reference to accompanying drawings. The present invention is not limited to the embodiments explained below.

[a] First Embodiment

Figure 1:
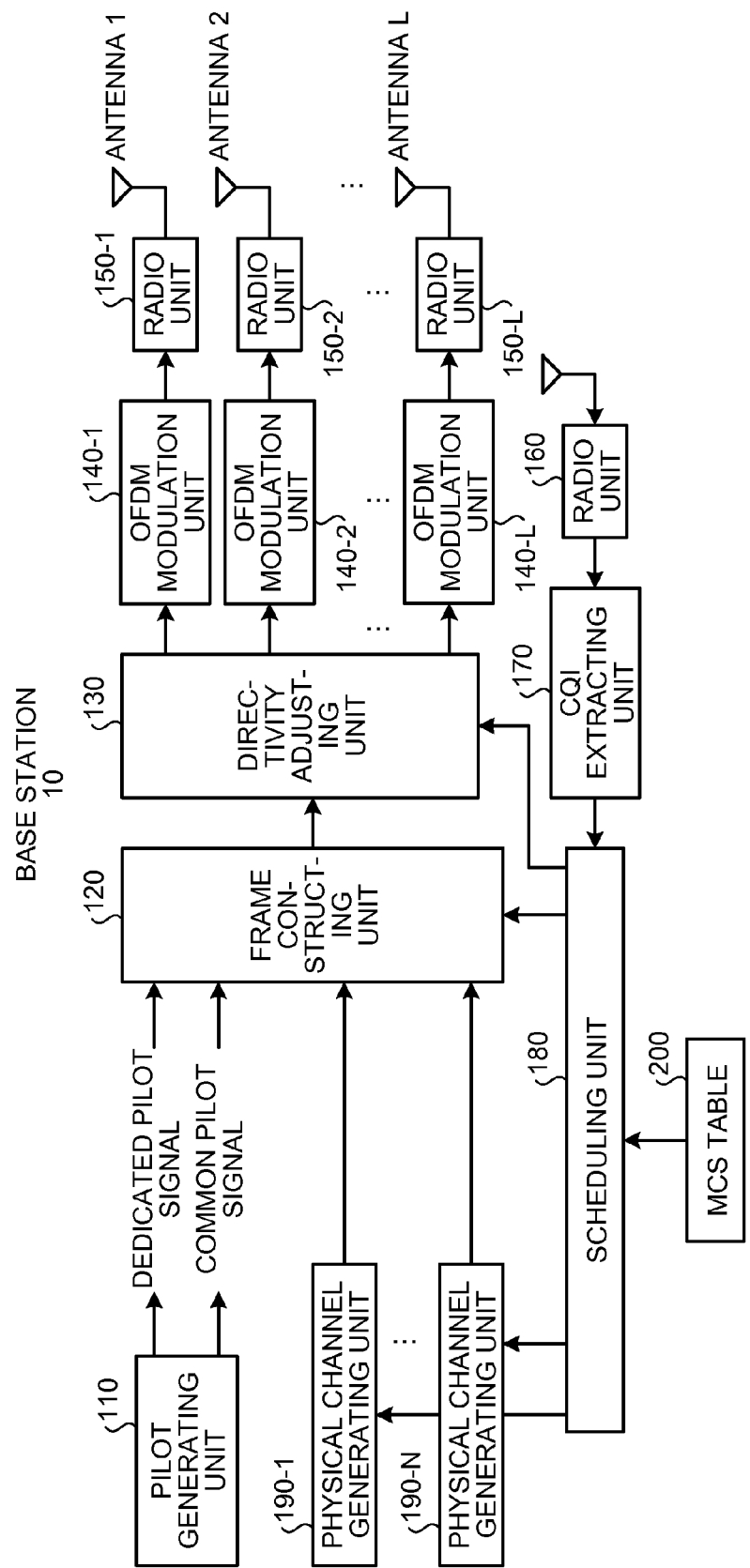
FIG. 1 is a functional block diagram illustrating the entire configuration of a base station according to a first embodiment.

FIG. 1 is a functional block diagram illustrating the entire configuration of a base station 10 according to the first embodiment. As illustrated in FIG. 1, the base station 10 includes a pilot generating unit 110, a frame constructing unit 120, a directivity adjusting unit 130, OFDM modulation units 140-1 to 140-L, radio units 150-1 to 150-L, a radio unit 160, a CQI extracting unit 170, a scheduling unit 180, physical channel generating units 190-1 to 190-N, an MCS table 200, and antennas 1 to L. Radio units 150-1 to 150-L may be realized by using analog circuits, and the other units may be realized by processor(s), e.g., Central Processing Unit (CPU), Digital Signal Processor (DSP).

The pilot generating unit 110 generates a dedicated pilot signal and a common pilot signal by using a cell identification number inherent in the base station. It will be below explained in detail about the configuration of the pilot generating unit 110.

Now, it will be explained about the configuration of a subframe including a dedicated pilot signal. First, it is assumed that a radio communication system according to the first embodiment is an OFDM system. In the OFDM system, the base station 10 transmits various types of signals to mobile devices by using a plurality of frequencies at the same time.

Figure 2:
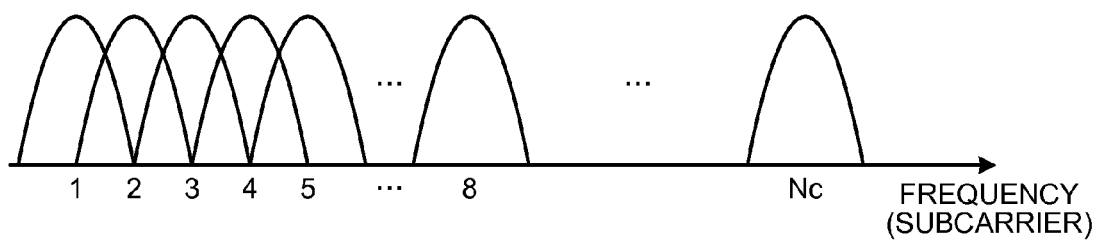
FIG. 2 is a diagram illustrating an example of a frequency of OFDM.

FIG. 2 is a diagram illustrating an example of a frequency that is used in OFDM. As illustrated in FIG. 2, the OFDM uses a plurality of superimposed frequencies, for example, Nc frequencies. For example, Nc is 1200. Nc frequencies are included in one symbol that indicates a communication unit time. The radio communication system superimposes a signal on each frequency and transmits the superimposed signal.

Figure 3:
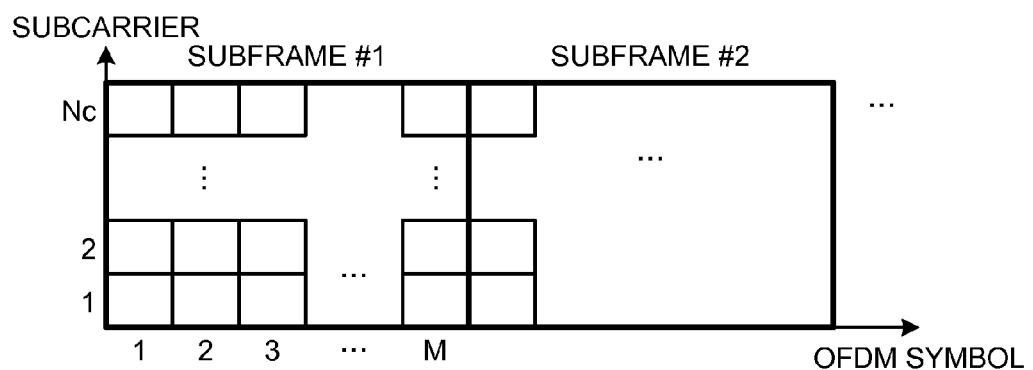
FIG. 3 is a diagram illustrating a relationship between a radio resource of a frequency * a time and a subframe.

FIG. 3 is a diagram illustrating a relationship between a subframe and a radio resource including a frequency and a symbol. As illustrated in FIG. 3, one subframe that is a communication unit includes, for example, radio resources that are divided like Nc frequencies * M symbols. The divided one radio resource is referred to as a resource element (hereinafter, "RE"). One subframe is constituted of the REs.

Figure 4:
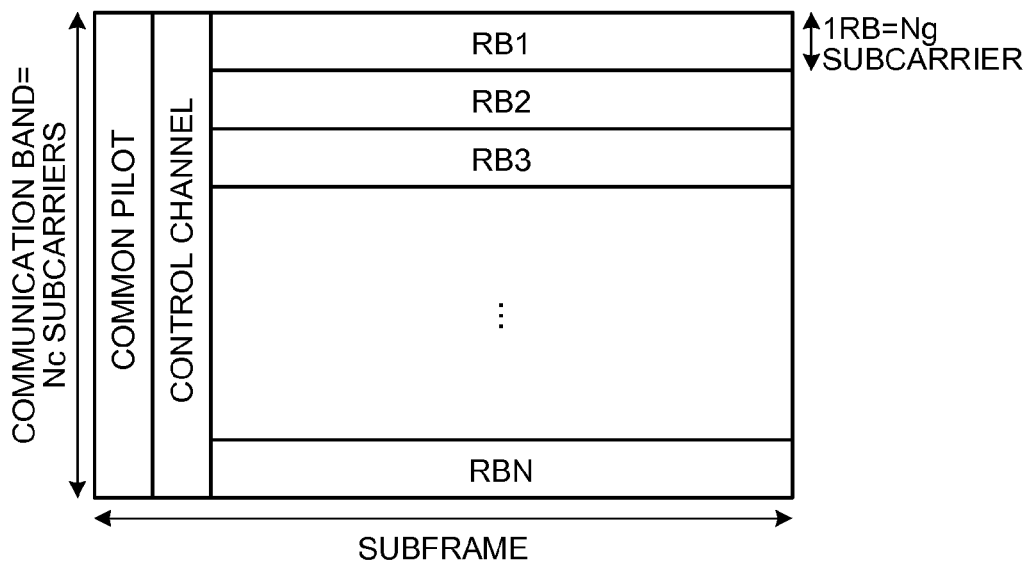
FIG. 4 is a diagram illustrating the configuration of a subframe.

Specifically, it will be explained about the configuration of a subframe of the radio communication system with reference to FIGS. 4 and 5 according to the first embodiment. As illustrated in FIG. 4, a subframe includes a common pilot signal, a control channel, and Nc resource blocks. The first symbol includes a common pilot signal that is regularly transmitted without directivity. The mobile device can take frequency synchronization and timing synchronization by using the common pilot signal. The second symbol includes a control channel (hereinafter, "PDCCH (Physical Control Channel)") for transmitting packet data control information. In order that the mobile device knows packet data information for itself, information such as the presence or absence of packet data for itself, an arrangement position, a modulation method, and an encoding ratio is superimposed on PDCCH. Symbols after the third symbol include divided resource blocks (RB) that correspond to N frequency bands. One RB is constituted of Ng subcarriers * (M-2) symbols. The number "Ng" is the number of subcarriers that are included in one frequency band. In this case, "N" indicative of the maximum number of a frequency band is a value that is obtained by dividing "Nc" that is the number of subcarriers included in all communication bands by "Ng" that is the number of subcarriers included in one RB. The one RB includes a traffic data channel (hereinafter, "PDSCH (Physical Downlink Shared Channel)") for transmitting packet data for one mobile device.

Figure 5:
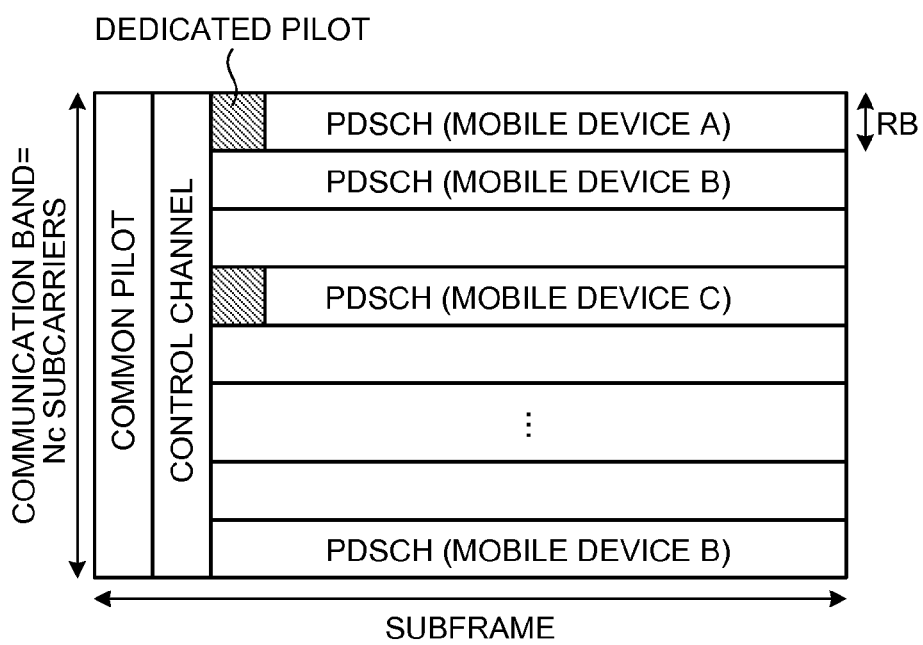
FIG. 5 is a diagram illustrating the configuration of a subframe.

FIG. 5 illustrates the configuration of a subframe in which a dedicated pilot is arranged. As illustrated in FIG. 5, a dedicated pilot signal is arranged in the RB in which PDSCH transmitted toward a mobile device A and a mobile device C is arranged. A dedicated pilot signal is arranged in the first one RE of RB in which PDSCH transmitted toward each mobile device is arranged, and is transmitted with the same frequency as that of packet data transmitted by PDSCH. As a result, because a pilot signal other than a common pilot signal is arranged in a subframe, the mobile device can take frequency synchronization and timing synchronization by using the dedicated pilot signal and thus can estimate the channel of PDSCH. A dedicated pilot signal may not be arranged in the RBs for all the mobile devices.

Returning to FIG. 1, the frame constructing unit 120 acquires the arrangement information of PDSCH for each the mobile device constituting a subframe from the scheduling unit 180, and assigns "PDSCH" and "transmission data, a common pilot signal, and a dedicated pilot signal" superimposed on the PDSCH to a radio resource constituted from a plurality of frequency bands and a plurality of symbols on the basis of the acquired arrangement information. The frame constructing unit 120 then outputs the assigned assignment data to the directivity adjusting unit 130.

The directivity adjusting unit 130 acquires directivity for each RE that constitutes RB from the scheduling unit 180, and adjusts the directivity for each RE of the assignment data acquired from the frame constructing unit 120. Specifically, when data $X_{km}$ arranged in RE(#k, #m) indicated by the frequency band #k and the symbol number #m is output to the antenna n in the case of PDSCH arranged in RB to which beam forming is applied, the directivity adjusting unit 130 adds a phase $Y_{k,m,n}$, which is expressed by the following mathematical expression, to $X_{km}$.

$$Y_{k,m,n} = \exp(2\pi j n \Delta \theta_{k,m}) X_{k,m}$$

At this time, it is assumed that $\Delta\theta_{k,m}$ is a constant value in the same RB. Moreover, in the case of PDSCH data, a common pilot signal, and PDCCH arranged in RB to which beam forming is not applied, the directivity adjusting unit 130 adds a phase $Y_{k,m,n}$, which is expressed by the following mathematical expression, to $X_{km}$.

$$Y_{k,m,n} = \delta_{n,1} X_{k,m}$$

In this case, $\delta_{n,1}$ is 1 in the case of n=1 and is 0 in the case of n≠1. In other words, the directivity adjusting unit 130 multiplies the output for the antenna 1 by one and multiplies the output for the other antennas by zero. Moreover, the directivity adjusting unit 130 outputs the assignment data for which the directivity for each RE is adjusted to the OFDM modulation units 140-1 to 140-L. Moreover, it has been explained about the system in which a common pilot signal is transmitted from only the antenna 1 in order to provide the simple embodiment. However, the system may transmit a plurality of common pilot signals #1, #2, . . . from a plurality of antennas. In this case, it is available to have the configuration that the common pilot signal #k is transmitted from only the antenna k, for example.

Upon acquiring the assignment data from the directivity adjusting unit 130, the OFDM modulation units 140-1 to 140-L multiplex a plurality of frequency bands on the basis of the acquired assignment data and generate one OFDM signal. Specifically, the OFDM modulation units 140-1 to 140-L modulate a radio resource by IFFT (Inverse FFT), and output the modulated OFDM signal to the radio units 150-1 to 150-L.

The radio units 150-1 to 150-L output the OFDM signal output from the OFDM modulation units 140-1 to 140-L to the corresponding antennas 1 to L.

The radio unit 160 acquires feedback information fed back from the plurality of mobile devices and outputs the feedback information to the CQI extracting unit 170.

The CQI extracting unit 170 acquires feedback information for each the mobile device output from the radio unit 160 and extracts CQI from the feedback information of each the mobile device. Then, the CQI extracting unit 170 outputs the CQI for each the mobile device to the scheduling unit 180.

The scheduling unit 180 determines the presence or absence of transmission of PDSCH for each the mobile device for each subframe. Moreover, the scheduling unit 180 determines one or a plurality of RBs of RBs included in one subframe with respect to the transmitted PDSCH for the mobile device. Specifically, the scheduling unit 180 acquires the CQI for each the mobile device from the CQI extracting unit 170, and determines a transmission method of PDSCH on the basis of the acquired CQI. In this case, a transmission method is a transmission frequency band, directivity, or the number of antennas used during transmission. However, the present invention is not limited to this. Moreover, the transmission method is previously determined by, for example, MIMO (Multiple Input Multiple Output), SFBC (Space Frequency Block Coding), or a combination of one or a plurality of beam forming. Then, the scheduling unit 180 determines RB corresponding to a frequency band determined for each the mobile device. At this time, the scheduling unit 180 arranges a dedicated pilot signal in RB in which PDSCH is arranged. Moreover, the scheduling unit 180 may modify the presence or absence of arrangement of a dedicated pilot signal arranged in RB for each the mobile device.

Furthermore, the scheduling unit 180 selects MCS from the MCS table 200 that stores a combination of an encoding ratio and a modulation method by using the CQI acquired by the CQI extracting unit 170 for each the mobile device, and determines a modulation method and an encoding ratio corresponding to the MCS. Then, the scheduling unit 180 outputs an encoding ratio and a modulation method for each the mobile device to the physical channel generating units 190-1 to 190-N corresponding to RB determined for the mobile devices. Moreover, the scheduling unit 180 outputs arrangement information of PDSCH for each the mobile device that constitutes a subframe to the frame constructing unit 120. Then, the scheduling unit 180 outputs directivity to the directivity adjusting unit 130 for each RE that constitutes RB determined for each the mobile device.

Figures 6, 7:
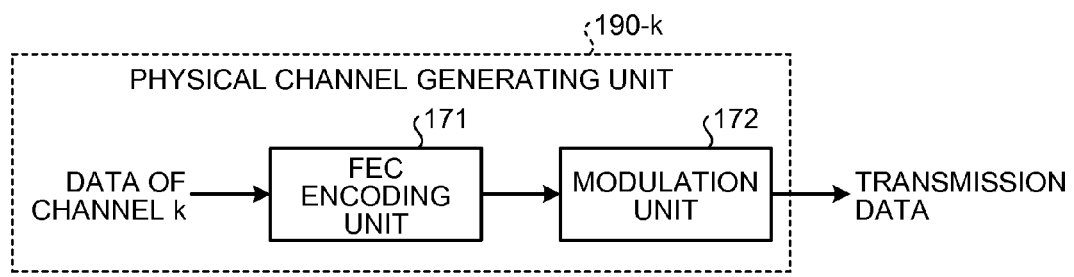
FIG. 6 is a functional block diagram illustrating the configuration of a physical channel generating unit.
FIG. 7 is a diagram illustrating an example of a data structure of an MCS table.

When the encoding ratio and modulation method for each the mobile device are acquired from the scheduling unit 180, the physical channel generating units 190-1 to 190-N FEC-encode and modulate data for the mobile device on the basis of the acquired encoding ratio and modulation method, and generates transmission data. Moreover, an FEC encoding method includes, for example, a turbo code, a convolutional code, and an LDPC code. However, the present invention is not limited to this. Now, it will be explained about the configuration of the physical channel generating units 190-1 to 190-N with reference to FIG. 6. As illustrated in FIG. 6, the physical channel generating unit 190-k (k=1 to N) includes an FEC encoding unit 171 and a modulation unit 172.

The FEC encoding unit 171 FEC-encodes data for a mobile device transmitted by the physical channel k indicating PDSCH or PDCCH with the encoding ratio acquired from the scheduling unit 180, and outputs the encoded data to the modulation unit 172.

The modulation unit 172 acquires the data output from the FEC encoding unit 171, modulates the data by using the modulation method acquired from the scheduling unit 180, and outputs the modulated and generated transmission data to the frame constructing unit 120.

The MCS table 200 is a table that holds a combination of an encoding ratio and a modulation method in correspondence with the reception environment of a mobile device. MCS is determined by the combination of an encoding ratio and a modulation method. Herein, it will be explained about the data structure of the MCS table 200 with reference to FIG. 7. As illustrated in FIG. 7, the MCS table 200 holds MCS, a modulation method, and an encoding ratio. MCS is an identification number that is uniquely determined from the modulation method and the encoding ratio, and is determined in correspondence with the reception environment of a mobile device. A modulation method is a method for modulating and transmitting data and includes various methods. In this case, the modulation method includes QPSK (Quadrature Phase Shift Keying), 16 QAM (Quadrature Amplitude Modulation), and 64 QAM. An encoding ratio is a ratio of an information bit of data and a bit after error correcting coding. In other words, it is most suitable that data for the mobile device having a good reception environment is modulated by using high-order multi-valued modulation of 16 QAM and 64 QAM and is encoded and transmitted with a high encoding ratio.

Figure 8:
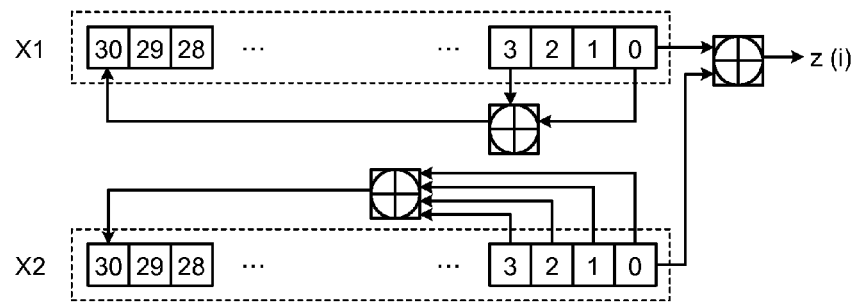
FIG. 8 is a diagram illustrating the configuration of a scramble series generator.

Next, it will be explained about the configuration of the pilot generating unit 110 with reference to FIG. 8. FIG. 8 is a functional block diagram illustrating the configuration of the pilot generating unit 110. As illustrated in FIG. 8, the pilot generating unit 110 generates a bit series of a dedicated pilot signal and a common pilot signal by using shift registers X1 and X2. A pilot signal is generated by a pseudo-random sequence initialized by using a cell identification number. In this case, a cell identification number is a number that is uniquely determined for each base station and is previously set for the base station.

Specifically, the pilot generating unit 110 generates a sequential bit series by the following repetition process. In this case, "i" is a counter for counting from the generation of series, and $x_1(a, i)$ is "a" bit position information of the i-th X1 shift register from the generation of series.

$$x_1(30, i+1) = (x_1(3, i) + x_1(0, i)) \bmod 2$$

$$x_2(30, i+1) = (x_2(3, i) + x_2(2, i) + x_2(1, i) + x_2(0, i)) \bmod 2$$

Then, the pilot generating unit 110 outputs, among X1 and X2 as described below, an exclusive OR of a mask processing result of only the shift register X2 and a result of the shift register X1.

$$z(i) = (x_1(i) + x_2(i)) \bmod 2$$

Next, the pilot generating unit 110 performs a parallel-serial conversion on the series z(i) to generate a bit series of a pilot signal of QPSK.

$$\mathrm{pilot}(i) = (1 - 2z(2i)) + (1 - 2z(2i+1))j$$

Moreover, the pilot generating unit 110 sets an initial value of $x_1(30, 0), \ldots, x_1(0, 0)$ in the configuration to $x_1(0, 0) = x_1(1, 0) = x_1(30, 0) = 1$, and initializes an initial value of $x_2(30, 0), \ldots, x_2(0, 0)$ by using a cell identification number as shown by the following Equation.

$$\sum_{k=0}^{30} x_2(k) 2^k = \text{cell identification number}$$

As a result, because a bit series of a dedicated pilot signal is generated by using an identification number inherent in a base station instead of an identification number inherent in a mobile device, the mobile device can receive not only a dedicated pilot signal for itself transmitted from the base station but also a dedicated pilot signal for another device transmitted from the same base station.

Figure 9:
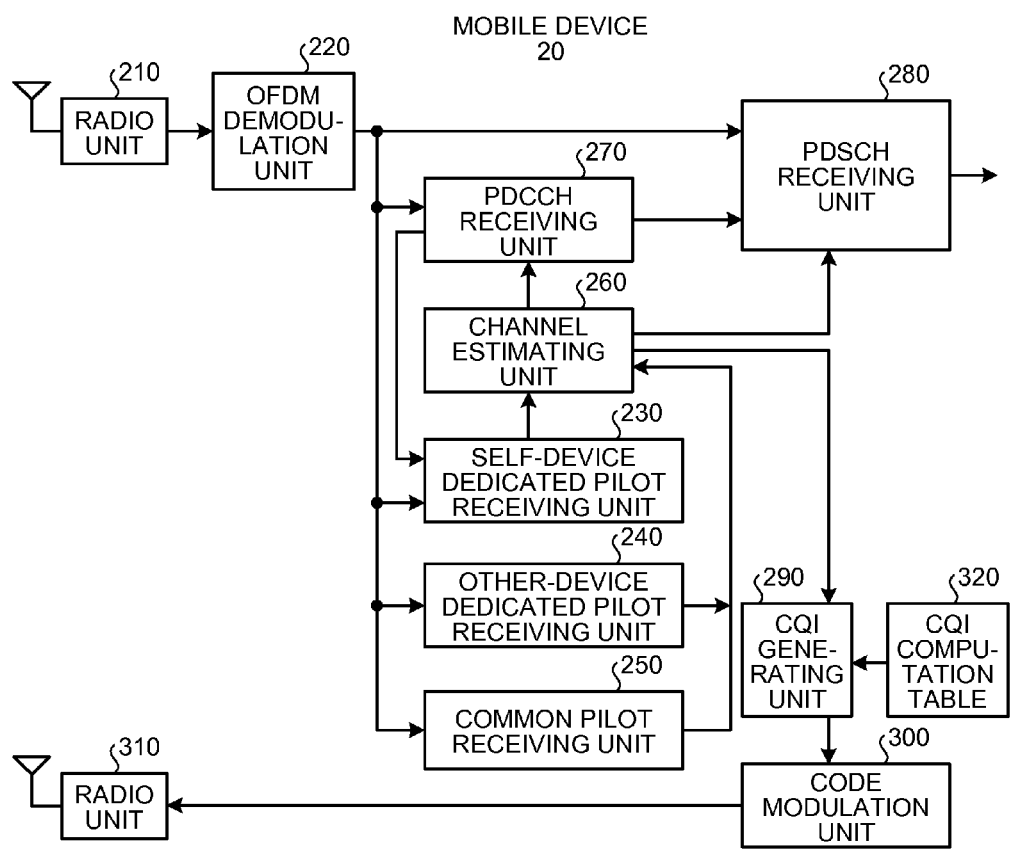
FIG. 9 is a functional block diagram illustrating the entire configuration of a mobile device according to the first embodiment.

FIG. 9 is a functional block diagram illustrating the entire configuration of a mobile device 20 according to the first embodiment. As illustrated in FIG. 9, the mobile device 20 includes a radio unit 210, an OFDM demodulation unit 220, a self-device dedicated pilot receiving unit 230, an other-device dedicated pilot receiving unit 240, a common pilot receiving unit 250, a channel estimating unit 260, a PDCCH receiving unit 270, a PDSCH receiving unit 280, a CQI generating unit 290, a code modulation unit 300, a radio unit 310, and a CQI computation table 320. The radio units 210 and 310 may be realized by using analog circuits, and the other units may be realized by processor(s), e.g., CPU and DSP.

The radio unit 210 receives an OFDM signal from the base station 10 and outputs the signal to the OFDM demodulation unit 220.

When the OFDM signal is acquired from the radio unit 210, the OFDM demodulation unit 220 extracts a frequency component for each symbol of the acquired OFDM signal. Specifically, the OFDM demodulation unit 220 demodulates the OFDM signal by using FFT (Fast Fourier Transform), and outputs the demodulated plurality of frequency components to the self-device dedicated pilot receiving unit 230, the other-device dedicated pilot receiving unit 240, the common pilot receiving unit 250, the PDCCH receiving unit 270, and the PDSCH receiving unit 280.

The self-device dedicated pilot receiving unit 230 receives the control information acquired from the PDCCH receiving unit 270. When there is PDSCH with reference to the presence or absence of PDSCH among the acquired control information, the self-device dedicated pilot receiving unit 230 acquires a plurality of frequency components from the OFDM demodulation unit 220. Then, the self-device dedicated pilot receiving unit 230 extracts a dedicated pilot signal superimposed on a frequency component corresponding to an arrangement position from the acquired frequency components with reference to the arrangement position among the control information, and outputs the extracted signal to the channel estimating unit 260.

Upon receiving the plurality of frequency components from the OFDM demodulation unit 220, the other-device dedicated pilot receiving unit 240 extracts a dedicated pilot signal superimposed on a frequency component for the other device from the acquired frequency components, and outputs the extracted signal to the channel estimating unit 260. In this case, because it is uncertain whether there is PDSCH for the other device and a bit series of a dedicated pilot signal inherent in the base station is known, the other-device dedicated pilot receiving unit 240 can receive a dedicated pilot signal when there is PDSCH for the other device. Moreover, even if there is not PDSCH for the other device, the other-device dedicated pilot receiving unit 240 receives a signal superimposed at the location at which a dedicated pilot signal is assigned assuming that the dedicated pilot signal exists. As a result, the dedicated pilot signals received by the self-device dedicated pilot receiving unit 230 and the other-device dedicated pilot receiving unit 240 are received by the maximum number of RBs that are obtained by dividing a communication band by frequency bands. After that, it is assumed that the signal received by the other-device dedicated pilot receiving unit 240 assuming that a dedicated pilot signal exists is also a dedicated pilot signal.

Upon receiving the plurality of frequency components from the OFDM demodulation unit 220, the common pilot receiving unit 250 extracts a common pilot signal superimposed on the frequency component from the acquired frequency component, and outputs the extracted signal to the channel estimating unit 260.

When a dedicated pilot signal for itself is acquired from the self-device dedicated pilot receiving unit 230, the channel estimating unit 260 estimates the amplitude and phase of a channel by using the acquired dedicated pilot signal. Moreover, the channel estimating unit 260 estimates SINR (Signal to Interference and Noise Ratio) that indicates a ratio of an electric power of a signal and an interference noise power by using the acquired dedicated pilot signal for itself. The channel estimating unit 260 then outputs the SINR estimated by the dedicated pilot signal for itself to the CQI generating unit 290.

When a dedicated pilot signal for the other device is acquired from the other-device dedicated pilot receiving unit 240, the channel estimating unit 260 estimates SINR by using the acquired dedicated pilot signal for the other device. The channel estimating unit 260 then outputs the SINR estimated by the dedicated pilot signal for the other device to the CQI generating unit 290.

When a common pilot signal is acquired from the common pilot receiving unit 250, the channel estimating unit 260 estimates the amplitude and phase of a channel by using the acquired common pilot signal. Moreover, the channel estimating unit 260 estimates SINR by using the acquired common pilot signal. The channel estimating unit 260 then outputs the SINR estimated by the common pilot signal to the CQI generating unit 290.

When the plurality of frequency components is acquired from the OFDM demodulation unit 220, the PDCCH receiving unit 270 extracts transmission data superimposed on the PDCCH from the acquired frequency component. Then, the PDCCH receiving unit 270 demodulates the extracted transmission data by using a channel estimation value based on the common pilot signal, and further performs convolution decoding on the transmission data. Moreover, the PDCCH receiving unit 270 extracts control information from the decoded transmission data and extracts control information including the presence or absence of PDSCH for itself, an arrangement position, and MCS. The PDCCH receiving unit 270 then outputs the extracted control information to the self-device dedicated pilot receiving unit 230 and the PDSCH receiving unit 280.

When the plurality of frequency components is acquired from the OFDM demodulation unit 220, the PDSCH receiving unit 280 extracts transmission data superimposed on the PDSCH from the acquired frequency component, and performs a synchronous detection on the transmission data by using the channel estimation value acquired from the channel estimating unit 260. The PDSCH receiving unit 280 then demodulates the transmission data on the basis of the encoding ratio and modulation method decided by the MCS, and decodes the demodulated FEC code.

When the SINR estimated by the dedicated pilot signal for itself, the dedicated pilot signal and the common pilot signal for the other device is acquired from the channel estimating unit 260, the CQI generating unit 290 determines CQI to be fed back to the base station on the basis of the acquired SINR. For example, the CQI generating unit 290 selects CQIs from the CQI computation table 320 by using the SINR of the dedicated pilot signals of all the RBs acquired by the channel estimating unit 260. Then, the CQI generating unit 290 determines all the selected CQIs as feedback information and outputs the result to the code modulation unit 300. Moreover, the CQI generating unit 290 may select CQIs corresponding to SINR of the dedicated pilot signals and the common pilot signal of all the RBs and determine all the selected CQIs as feedback information. Moreover, the CQI generating unit 290 may select CQIs corresponding to SINR of the dedicated pilot signals and the common pilot signal of all the RBs, compare CQIs for each the same frequency band, and determine high CQI as feedback information. In this case, the CQI generating unit 290 may determine a result obtained by rearranging the determined feedback information by the predetermined number in descending order of CQIs as feedback information.

The code modulation unit 300 FEC-encodes and modulates the feedback information output from the CQI generating unit 290. Then, the code modulation unit 300 outputs the modulated feedback information to the radio unit 310. Moreover, an FEC encoding method includes, for example, a turbo code, a convolutional code, an LDPC code. However, the present invention is not limited to this.

The radio unit 310 acquires the feedback information from the code modulation unit 300 and transmits the acquired information to the base station.

Figures 10, 11:
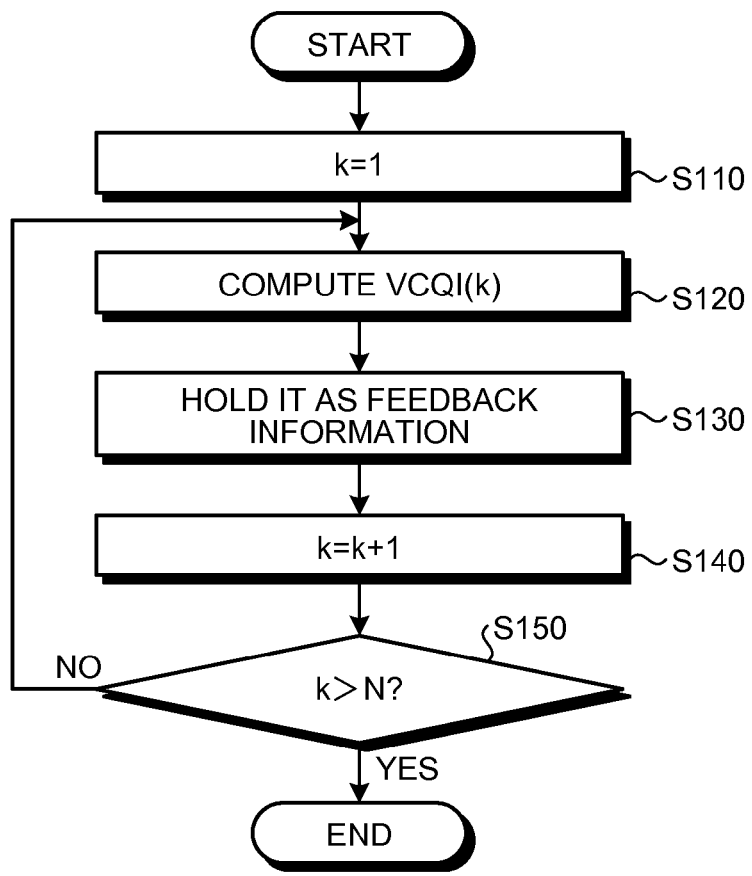
FIG. 10 is a diagram illustrating an example of a data structure of a CQI computation table.
FIG. 11 is a flowchart illustrating a process that is performed by a CQI generating unit.

The CQI computation table 320 is a table for computing CQI on the basis of SINR. It will be explained about the data structure of the CQI computation table 320 with reference to FIG. 10. As illustrated in FIG. 10, the CQI computation table 320 holds the CQI and the range of SINR in correspondence with each other. In an example of FIG. 10, when γ indicative of SINR is γ<TH[0], CQI indicates zero and thus a reception environment becomes the lowest. When γ is TH[15]≤γ, CQI indicates the maximum value 15 and thus a reception environment becomes the highest. Herein, TH[k] (k=1 to 15) is a threshold for indicating a range of SINR. When the base station 10 transmits data modulated by MCS of the same MCS identification number as the CQI value to the mobile device, TH[k] is an optimized value in such a manner that transmission efficiency, namely, reception throughput becomes larger. The value of TH[k] is dependent on, for example, the configuration of the mobile device 20 and SINR estimation precision and is optimized by error rate characteristics for each MCS determined by the design of the mobile device 20.

Next, it will be explained about a process performed by the CQI generating unit 290 with reference to FIG. 11. FIG. 11 is a flowchart illustrating a process that is performed by the CQI generating unit 290. Herein, it is assumed that the number of RBs is "N" that is the maximum number of frequency bands and the RBs are distinguished by indices indicated in ascending order from the low band of the frequency bands. It is assumed that VCQI is CQI that is computed by a dedicated pilot signal.

First, the CQI generating unit 290 acquires SINRs estimated by the dedicated pilot signals of all the RBs from the channel estimating unit 260. The CQI generating unit 290 then sets an index "k" to "1"(S110).

Next, the CQI generating unit 290 computes VCQI on the basis of the SINR estimated by the dedicated pilot signal of the RB of the index "k" (S120). For example, the CQI generating unit 290 selects CQI from the CQI computation table 320 by using the SINR.

Furthermore, the CQI generating unit 290 holds the computed VCQI as feedback information (S130).

Next, the CQI generating unit 290 adds "1" to the index "k" (S140).

The CQI generating unit 290 determines whether the index "k" is larger than "N" (S150). In other words, the CQI generating unit 290 determines whether the VCQIs for all the frequency bands are computed. Then, when the index "k" is not more than "N" (S150: No), the CQI generating unit 290 computes VCQI for the index "k".

Meanwhile, when the index "k" is larger than "N" (S150: Yes), the CQI generating unit 290 terminates the process.

Figure 12:
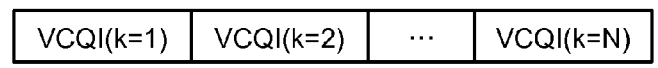
FIG. 12 is a diagram illustrating an example configuration of feedback information.

Next, it will be explained about the configuration of feedback information held by the process of the CQI generating unit 290 with reference to FIG. 12. FIG. 12 is a diagram illustrating an example configuration of feedback information. As illustrated in FIG. 12, the VCQIs generated from the dedicated pilot signals of all the RBs are held in feedback information. Herein, because CQIs of VCQIs of the feedback information are from 0 to 15, VCQI is expressed by four bits.

As a result, the mobile device 20 can feed back the feedback information held by the CQI generating unit 290 to the base station 10, and can supply the VCQIs of all the frequency bands to the base station by using the dedicated pilot signal for the other device in addition to the dedicated pilot signal for itself. As a result, the base station 10 can assign the most suitable radio resource to each the mobile device.

Meanwhile, it has been explained about the case where the CQI generating unit 290 generates CQIs by using the dedicated pilot signals of all the frequency bands and generates feedback information. However, the present invention is not limited to this. The CQI generating unit 290 may generate CQIs by using the dedicated pilot signals and the common pilot signal of all the frequency bands and generate feedback information including a comparison result for the same frequency band.

According to the first alternative example of the CQI generating unit 290, it will be explained about a case where the CQI generating unit 290 generates CQIs by using the dedicated pilot signals and the common pilot signal of all the frequency bands and generates feedback information including the comparison result for the same frequency band with reference to FIGS. 13 and 14.

Figure 13:
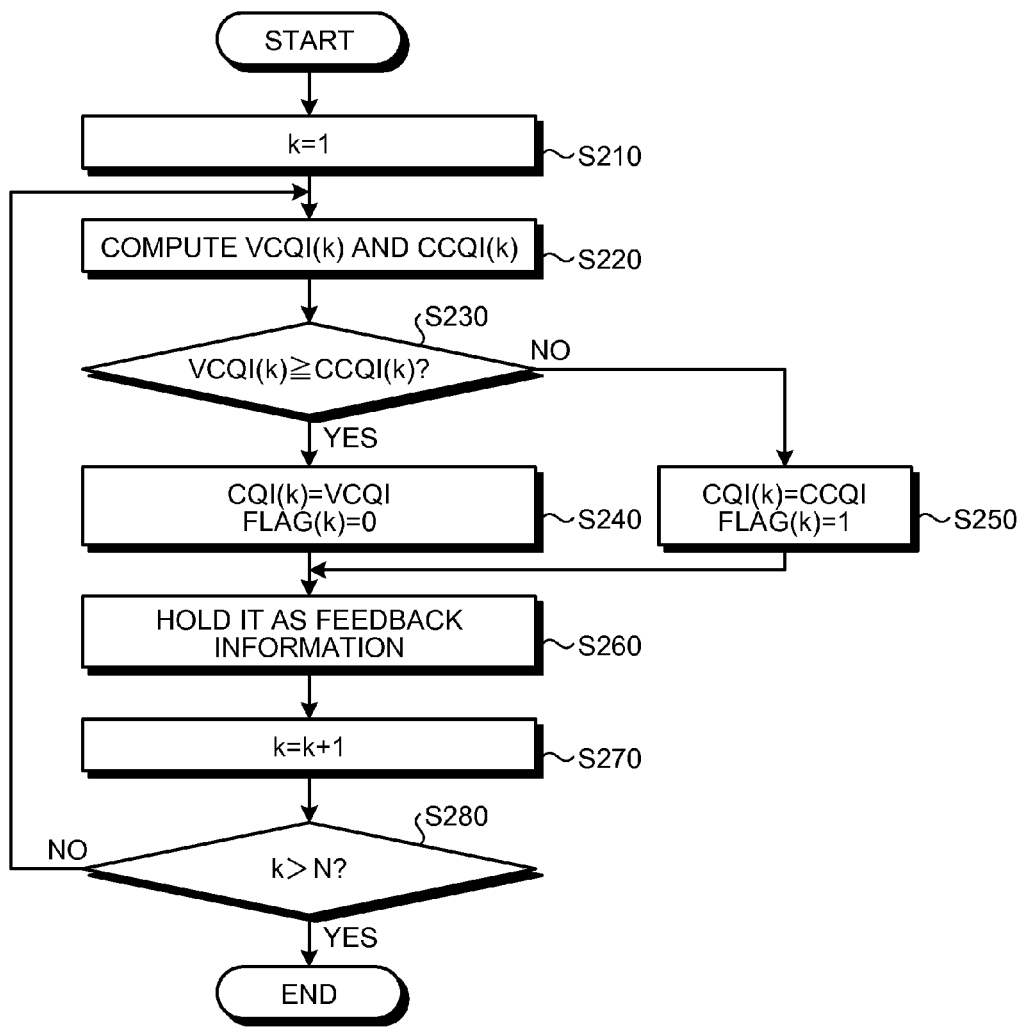
FIG. 13 is a flowchart illustrating a process that is performed by the CQI generating unit (alternative example 1)

FIG. 13 is a flowchart illustrating a process performed by the CQI generating unit 290 according to the first alternative example. Herein, it is assumed that the number of RBs is "N" that is the maximum number of frequency bands and the RBs are distinguished by indices indicated in ascending order from the low band of the frequency bands. It is assumed that VCQI is CQI computed by a dedicated pilot signal and CCQI is CQI computed by a common pilot signal.

First, the CQI generating unit 290 acquires SINRs estimated by the dedicated pilot signals and the common pilot signal of all the RBs from the channel estimating unit 260. The CQI generating unit 290 then sets the index "k" to "1" (S210).

Next, the CQI generating unit 290 computes VCQI and CCQI on the basis of the SINR estimated by the dedicated pilot signal and the common pilot signal of the RB of the index "k" (S220). For example, the CQI generating unit 290 selects CQI from the CQI computation table 320 by using the SINR.

Then, the CQI generating unit 290 compares the computed VCQI and CCQI and determines whether VCQI is not less than CCQI (S230).

When it is determined that VCQI is not less than CCQI (S230: Yes), the CQI generating unit 290 sets the CQI of the index "k" to VCQI and sets the flag of the index "k" to "0" (S240).

On the other hand, when it is determined that VCQI is less than CCQI (S230: No), the CQI generating unit 290 sets the CQI of the index "k" to CCQI and sets the flag of the index "k" to "1" (S250).

Then, the CQI generating unit 290 holds the set CQI and flag in the feedback information (S260).

Next, the CQI generating unit 290 adds "1" to the index "k" (S270).

Furthermore, the CQI generating unit 290 determines whether the index "k" is larger than "N" (S280). In other words, the CQI generating unit 290 determines whether the VCQI and CCQI for all the frequency bands are compared. Then, when the index "k" is not more than "N" (S280: No), the CQI generating unit 290 computes the VCQI and CCQI of the index "k".

On the other hand, when the index "k" is larger than "N" (S280: Yes), the CQI generating unit 290 terminates the process.

Next, it will be explained about the configuration of feedback information held by the process of the CQI generating unit 290 according to the first alternative example with reference to FIG. 14. FIG. 14 is a diagram illustrating an example configuration of the feedback information according to the first alternative example. As illustrated in FIG. 14, the feedback information holds a flag that indicates a result obtained by comparing VCQI and CCQI for each RB and VCQI for RB when VCQI is not less than CCQI for each RB. Herein, a flag is indicated by N bits corresponding to the maximum number of frequency bands. It is indicated by "0" or "1" whether VCQI computed by a dedicated pilot signal for each RB is not less than CCQI computed by a common pilot signal. Then, in RB at the location "0" in the flag, VCQI is held in a region following the flag. In the example of FIG. 14, the flag is held as '010 . . . 01'. In the RB corresponding to the location "0" in the flag, in other words, the index k=1, 3 . . . , and N, VCQI is held in the following region.

As a result, the mobile device 20 can set VCQIs not less than CCQI for each RB as feedback information so as to normally generate VCQI and to feed back useful information as a reception environment to the base station. In other words, even if there is not PDSCH for the other device, the mobile device 20 generates VCQI assuming that a dedicated pilot signal exists. However, because the VCQI generated in this case becomes an abnormal value that is smaller than CCQI, the VCQI becomes useless information. Therefore, the mobile device 20 can reduce an amount of feedback information by deleting the useless information from feedback information.

Moreover, as to the feedback information held by the process of the CQI generating unit 290 according to the first alternative example, the CQI generating unit 290 compares VCQI and CCQI for the same frequency band and thus holds VCQIs not less than CCQI. However, the CQI generating unit 290 may hold CQI of the large one among VCQI and CCQI.

Now, it will be explained about the feedback information with reference to FIGS. 15 and 16 for which the CQI generating unit 290 compares VCQI and CCQI for the same frequency band and thus holds CQI of the large one among VCQI and CCQI. It is explained about feedback information in FIG. 15 for which CQIs of the large one among VCQI and CCQI are held for all the RBs. Moreover, it is explained about feedback information in FIG. 16 for which CQIs of the large one among VCQI and CCQI are held in descending order by a predetermined number.

In FIG. 15, feedback information holds a flag indicative of a result obtained by comparing VCQI and CCQI for each RB and CQI of the large one among VCQI and CCQI for each RB. A flag is indicated by N bits corresponding to the maximum number of frequency bands, and it is indicated by "0" or "1" which of VCQI and CCQI for each RB is large. In the case of "0" in the flag, VCQI of RB corresponding to the location "0" is held in a region following the flag. In the case of "1" in the flag, CCQI of RB corresponding to the location "1" is held in the region following the flag.

Figures 16, 17:
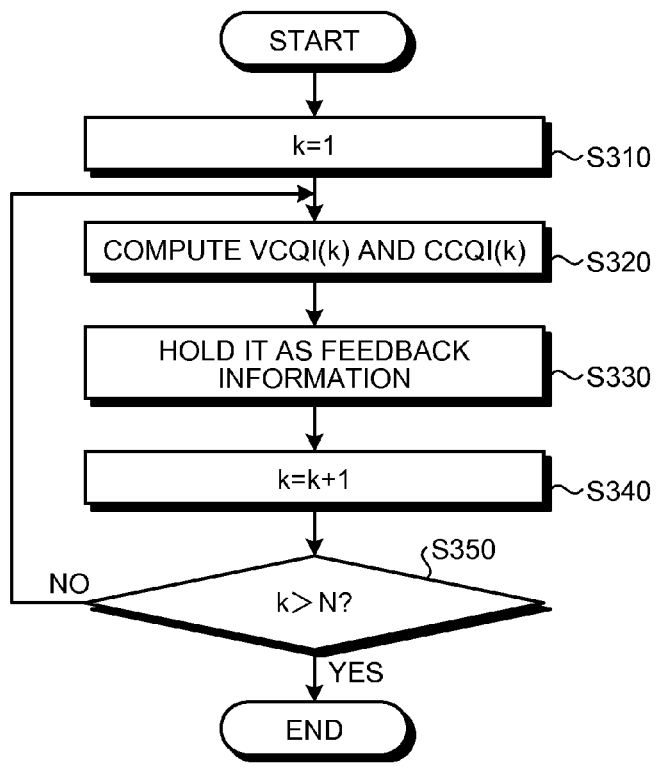
FIG. 16 is a diagram illustrating an example configuration of feedback information (alternative example 1-3)
FIG. 17 is a flowchart illustrating a process that is performed by the CQI generating unit (alternative example 2)

In FIG. 16, the feedback information holds an average value of VCQIs of all the RBs and an average value of CCQIs of all the RBs, a flag of M bits indicating a result obtained by comparing VCQI and CCQI for each RB, and M pieces of CQI information making a pair of the RB number and the CQI. The CQI information holds M (<N) pieces of the CQI and the RB number of the large one among VCQI and CCQI for each RB in descending order of CQIs. Herein, it is assumed that the RB number is a number indicated from "1" in ascending order of frequency bands. A flag is information that indicates the type of CQI (for example, VCQI=0, CCQI=1) indicated by CQI information in ascending order of the RB numbers.

Meanwhile, it has been explained about the case where the CQI generating unit 290 generates CQIs by using the dedicated pilot signals and the common pilot signal of all the frequency bands and generates feedback information including the comparison result for the same frequency band. However, the present invention is not limited to this. The CQI generating unit 290 may generate CQIs by using the dedicated pilot signals and the common pilot signal of all the frequency bands and generate feedback information including the generated both CQIs.

Figure 18:
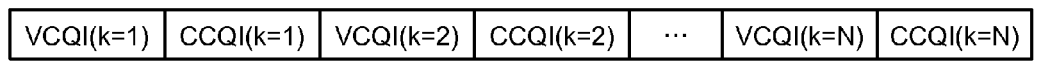
FIG. 18 is a diagram illustrating an example configuration of feedback information (alternative example 2)

According to the second alternative example of the CQI generating unit 290 to be described below, it will be explained about a case where the CQI generating unit 290 generates CQIs by using the dedicated pilot signals and the common pilot signals of all the frequency bands and generates feedback information with reference to FIGS. 17 and 18.

FIG. 17 is a flowchart illustrating a process performed by the CQI generating unit according to the second alternative example. Herein, it is assumed that the number of RBs is "N" that is the maximum number of frequency bands and the RBs are distinguished by indices indicated in ascending order from the low band of the frequency bands. Moreover, it is assumed that VCQI is CQI computed by a dedicated pilot signal and CCQI is CQI computed by a common pilot signal.

First, the CQI generating unit 290 acquires SINRs estimated by the dedicated pilot signals and the common pilot signal of all the RBs from the channel estimating unit 260. The CQI generating unit 290 then sets the index "k" to "1" (S310).

Next, the CQI generating unit 290 computes VCQI and CCQI on the basis of the SINR estimated by the dedicated pilot signal and the common pilot signal of the RB of the index "k" (S320). For example, the CQI generating unit 290 selects CQI from the CQI computation table 320 by using the SINR.

The CQI generating unit 290 holds the computed VCQI and CCQI as the feedback information (S330).

Next, the CQI generating unit 290 adds "1" to the index "k" (S340).

Furthermore, the CQI generating unit 290 determines whether the index "k" is larger than "N" (S350). In other words, the CQI generating unit 290 determines whether VCQIs for all the frequency bands are computed. Then, when the index "k" is not more than "N" (S350: No), the CQI generating unit 290 computes the VCQI and CCQI of the index "k".

On the other hand, when the index "k" is larger than "N" (S350: Yes), the CQI generating unit 290 terminates the process.

Next, it will be explained about the configuration of feedback information held by the process of the CQI generating unit 290 with reference to FIG. 18. FIG. 18 is a diagram illustrating an example configuration of feedback information. As illustrated in FIG. 18, feedback information holds VCQIs generated from the dedicated pilot signals of all the RBs and CCQI generated from the common pilot signal. Because the VCQI and CCQI of the feedback information have CQIs from 0 to 15, the VCQI and CCQI are expressed by four bits.

As a result, because the mobile device 20 can set the VCQI and CCQI generated for each RB as feedback information to feed back the self-device reception environment in all the frequency bands to the base station, the base station can assign an optimum radio resource and perform an AMC control.

Figure 19:
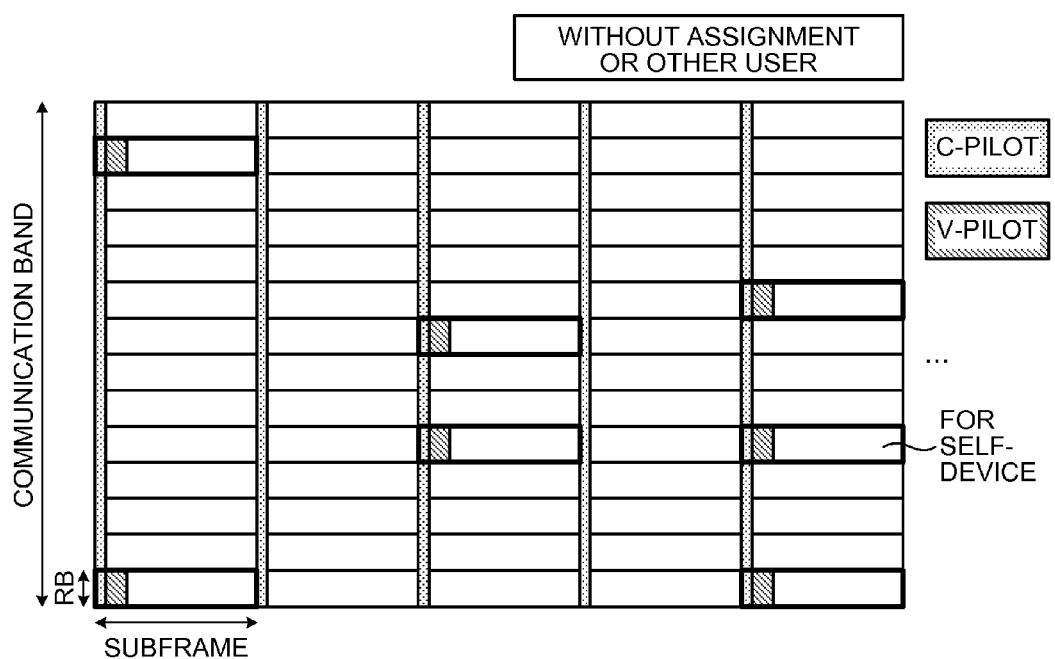
FIG. 19 is a diagram illustrating an example of a transmission state of RB to which a dedicated pilot is applied.
Figure 20:
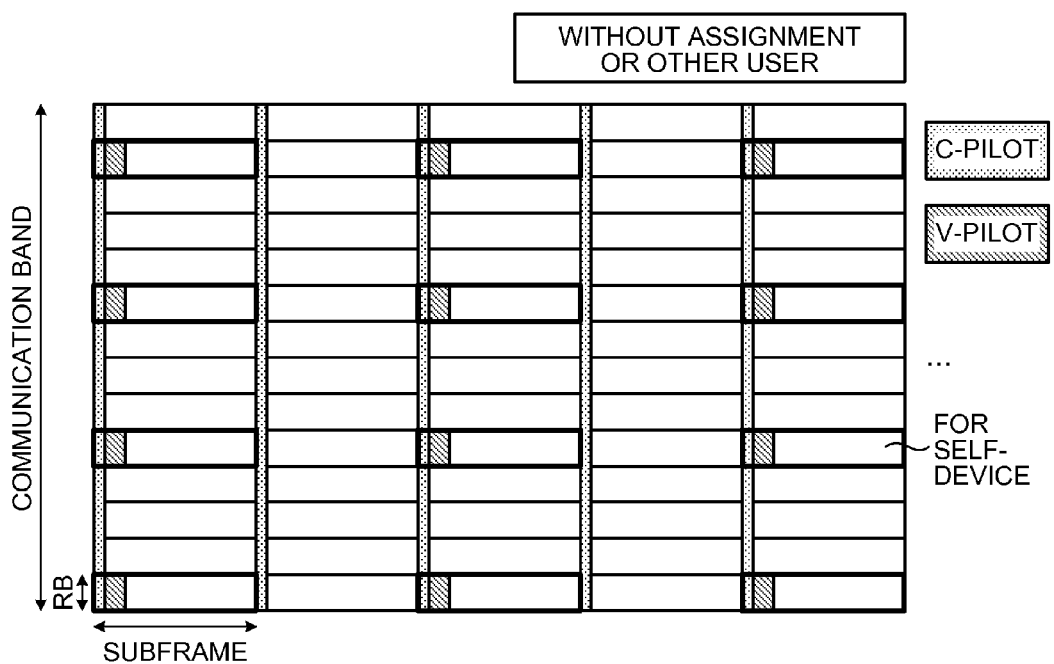
FIG. 20 is a diagram illustrating another example of a transmission state of RB to which a dedicated pilot is applied.

Next, it will be explained about an example of a transmission state of the radio communication system according to the first embodiment with reference to FIGS. 19 and 20. In FIG. 19, it is explained about a case where RB to which a dedicated pilot signal is applied is not previously determined. In FIG.

20, it is explained about a case where RB to which a dedicated pilot signal is applied is previously determined.

First, it will be explained about a transmission state when RB to which a dedicated pilot signal is applied is not previously determined with reference to FIG. 19. FIG. 19 is a diagram illustrating a transmission state of a dedicated pilot signal that can be recognized from one mobile device when the base station transmits data to the plurality of mobile devices. As illustrated in FIG. 19, the base station performs transmission using PDSCH on the plurality of mobile devices. Because the one mobile device is a dedicated pilot signal inherent in the base station, the mobile device can grasp a dedicated pilot signal for the other device in addition to a dedicated pilot signal for itself.

As a result, the mobile device can feed back CQI computed by the dedicated pilot signal arranged in RB for the other device other than the self-device to the base station. Therefore, the base station can acquire CQI for one RB from the plurality of mobile devices and can assign an optimum radio resource by using the acquired CQI. Moreover, because the mobile device can receive the dedicated pilot signal for the other device, the mobile device can preliminarily compute CQI by using the dedicated pilot signal for the other device even if transmission using PDSCH for itself is the first, and thus the base station can assign an efficient radio resource.

Next, it will be explained about a transmission state when RB to which a dedicated pilot signal is applied is previously determined with reference to FIG. 20. FIG. 20 illustrates a transmission state of a dedicated pilot signal that is assigned by the base station to a predetermined RB as a subframe for each predetermined period. As illustrated in FIG. 20, the base station transmits a dedicated pilot signal to the plurality of mobile devices by using RBs that are arranged periodically and discretely.

As a result, because the base station preliminarily and transmits a dedicated pilot signal assigned to this RB when a radio resource for a mobile device is assigned by using a certain RB, the base station can preliminarily acquire CQI for the RB and thus can assign an efficient radio resource. Moreover, the base station can feed back CQI computed by the dedicated pilot signal to the mobile device by using the discretely arranged RBs and a propagation path having high independence, and thus can assign a further optimum radio resource.

As described above, according to the first embodiment, the mobile device 20 receives a dedicated pilot signal included in a dedicated pilot signal part of the data unit that is transmitted from the base station 10 to the self-device and receives a signal included in a dedicated pilot signal part of the data unit that is transmitted from the base station 10 to the other device other than the self-device. Then, the mobile device 20 estimates channel estimation values (CQI) that indicate reception environments when the self-device receives data on the basis of the signal included in the received dedicated pilot signal for itself and dedicated pilot signal part for the other device. Then, the mobile device 20 transmits the estimated each CQI to the base station 10.

In this way, the mobile device 20 can feed back the plurality of reception environments using a dedicated pilot signal other than the self-device in addition to a dedicated pilot signal for the self-device to the base station. Therefore, the base station 10 can know the optimum reception environment of the mobile device 20 and can perform the optimum determination of MCS and the assignment of an optimum radio resource when data is transmitted to the mobile device 20.

[b] Second Embodiment

In the first embodiment, it has been explained about the case where the mobile device generates CQI assuming that a dedicated pilot signal for the other device exists even if PDSCH for the other device is not in all the RBs. However, the present invention is not limited to this. When PDSCH for the other device is in all the RBs, the mobile device may generate CQI by using the dedicated pilot signal for the other device.

Figure 21:
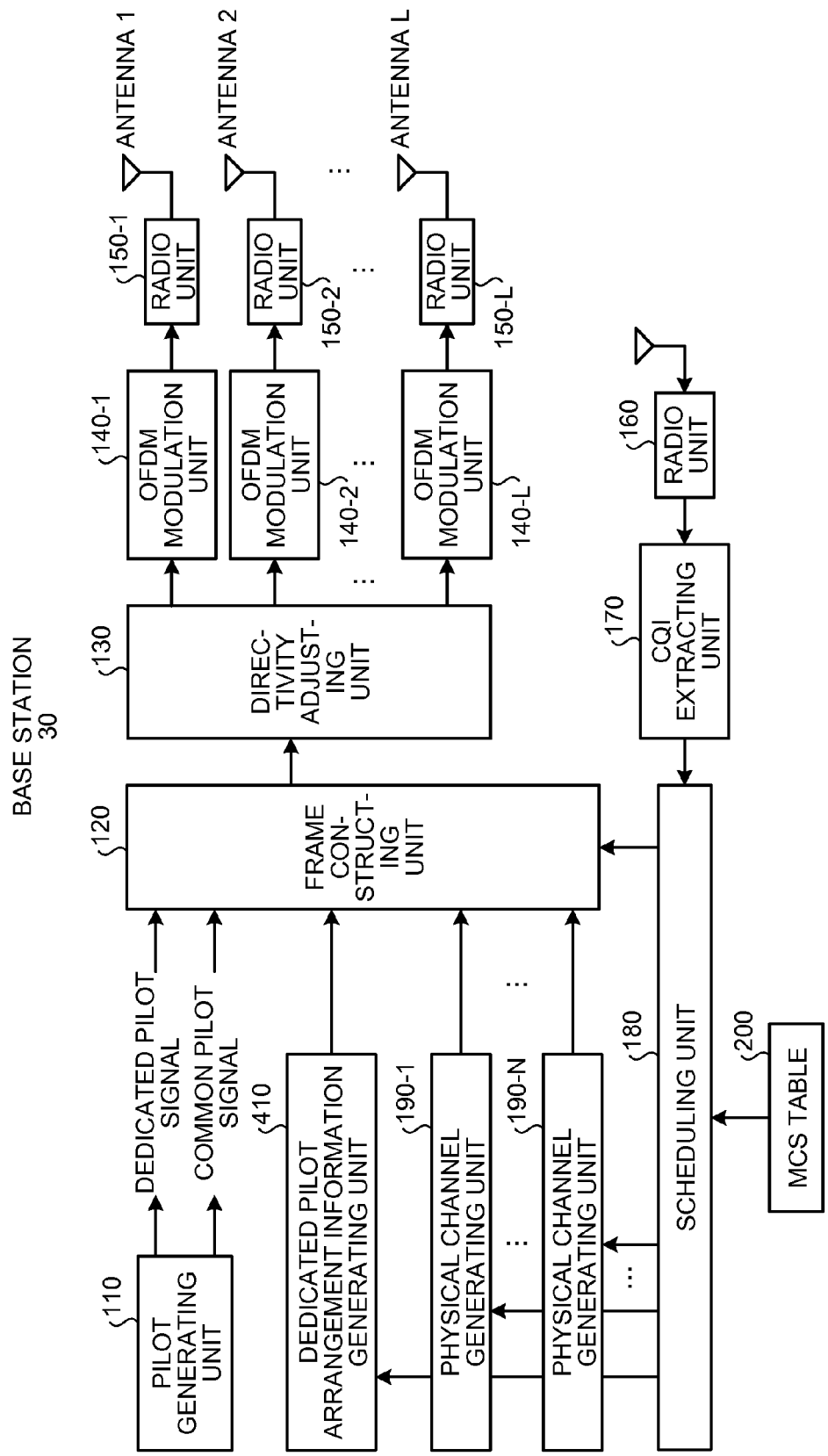
FIG. 21 is a functional block diagram illustrating the entire configuration of a base station according to a second embodiment.

Therefore, in the second embodiment, it will be explained about the case where the mobile device generates CQI by using a dedicated pilot signal for the other device when PDSCH for the other device is in all the RBs. First, it will be explained about the entire configuration of a base station according to the second embodiment with reference to FIG. 21. FIG. 21 is a functional block diagram illustrating the entire configuration of a base station 30 according to the second embodiment. As illustrated in FIG. 21, the base station 30 according to the second embodiment further includes a dedicated pilot arrangement information generating unit 410 unlike the base station 10 (FIG. 1) according to the first embodiment. The same units of FIG. 21 as those of FIG. 1 have the same reference numbers, and their specific descriptions are omitted.

The scheduling unit 180 determines whether PDSCH for each mobile device is transmitted every subframe. Moreover, the scheduling unit 180 determines one RB or RBs in one subframe with respect to PDSCH to be transmitted to the mobile device. At this time, the scheduling unit 180 arranges the dedicated pilot signal in the determined RB. Moreover, the scheduling unit 180 may change, for each mobile device, the presence or absence of the arrangement of the dedicated pilot signal that is arranged in RB. Then, the scheduling unit 180 outputs the information of the RB in which the dedicated pilot signal is arranged to the dedicated pilot arrangement information generating unit 410.

Figure 22:
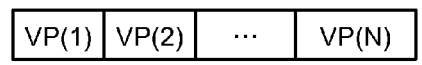
FIG. 22 is a diagram illustrating an example configuration of dedicated pilot arrangement information.

Upon acquiring the information of the RB in which the dedicated pilot signal(VP) is arranged from the scheduling unit 180, the dedicated pilot arrangement information generating unit 410 generates dedicated pilot arrangement information that indicates whether a dedicated pilot signal is arranged for each RB. Herein, it will be explained about dedicated pilot arrangement information with reference to FIG. 22. As illustrated in FIG. 22, the dedicated pilot arrangement information indicates whether a dedicated pilot signal is arranged in RB corresponding to a number indicated in ascending order of frequency bands from "1" by using N bits corresponding to all the RBs (N pieces in FIG. 22). For example, "1" is set when a dedicated pilot signal is arranged in one RB and "0" is set when a dedicated pilot signal is not arranged in one RB.

The frame constructing unit 120 acquires the arrangement information of PDSCH for each mobile device that constitutes a subframe from the scheduling unit 180. Moreover, the frame constructing unit 120 acquires the dedicated pilot arrangement information from the dedicated pilot arrangement information generating unit 410. Then, the frame constructing unit 120 generates control information including the dedicated pilot arrangement information. Then, the frame constructing unit 120 assigns the control information superimposed on PDCCH, the transmission data superimposed on PDSCH, the common pilot signal, and the dedicated pilot signal to the radio resource that is constituted from the plurality of frequency bands and the plurality of symbols, on the basis of the arrangement information of PDSCH for each mobile device. The frame constructing unit 120 then outputs the assigned assignment data to the directivity adjusting unit 130.

Figure 23:
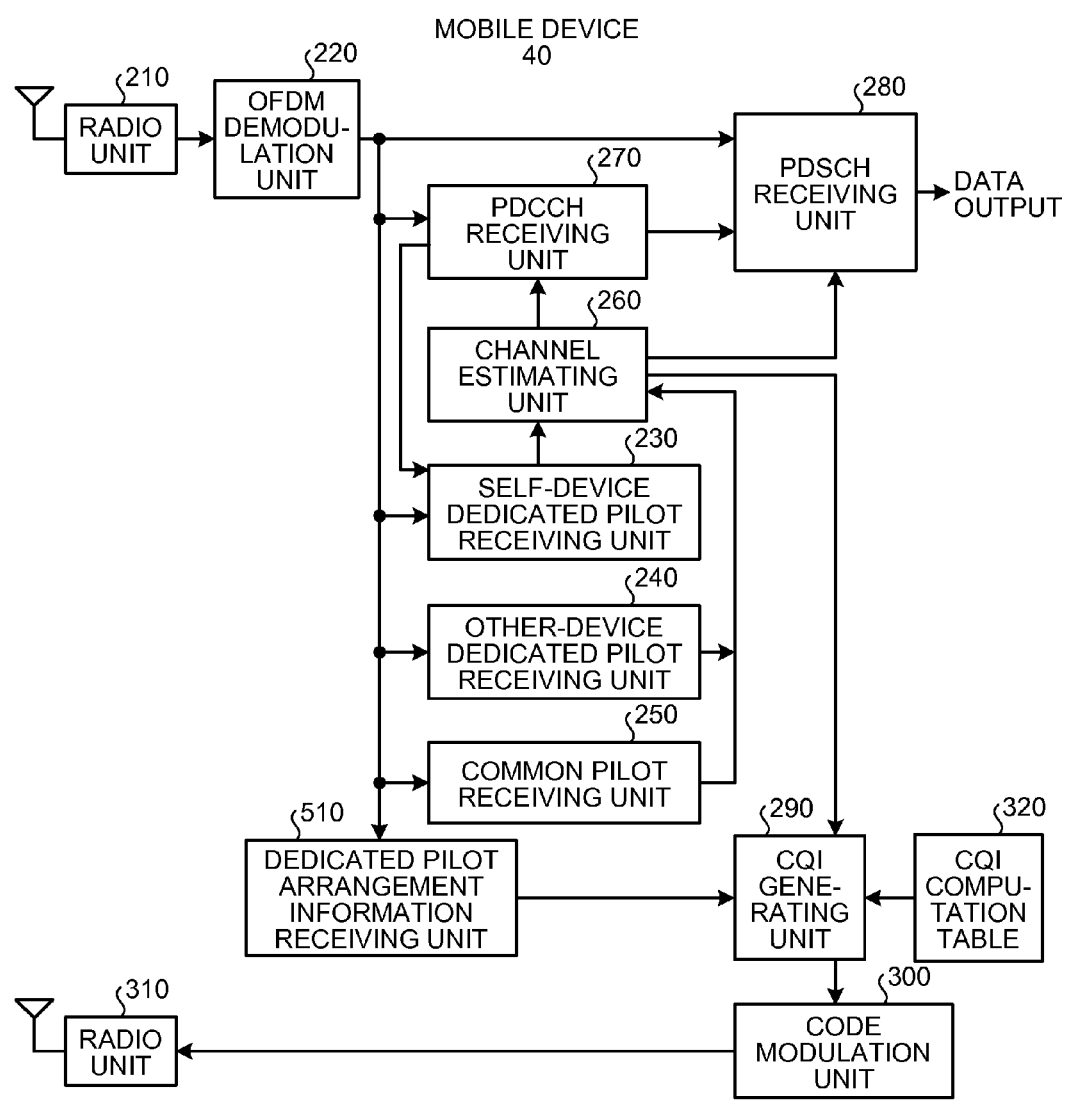
FIG. 23 is a functional block diagram illustrating the entire configuration of a mobile device according to the second embodiment.

Next, it will be explained about the entire configuration of a mobile device according to the second embodiment with reference to FIG. 23. FIG. 23 is a functional block diagram illustrating the entire configuration of a mobile device 40 according to the second embodiment. As illustrated in FIG. 23, the mobile device 40 according to the second embodiment further includes a dedicated pilot arrangement information receiving unit 510 unlike the mobile device 20 (FIG. 9) according to the first embodiment. The same units of FIG. 23 as those of FIG. 9 have the same reference numbers, and their specific descriptions are omitted.

Upon acquiring the plurality of frequency components from the OFDM demodulation unit 220, the dedicated pilot arrangement information receiving unit 510 extracts dedicated pilot arrangement information superimposed on PDCCH from the acquired frequency components. The dedicated pilot arrangement information receiving unit 510 then outputs the extracted dedicated pilot arrangement information to the CQI generating unit 290.

Upon acquiring the dedicated pilot arrangement information from the dedicated pilot arrangement information receiving unit 510, the CQI generating unit 290 acquires the RB in which a dedicated pilot is arranged from the dedicated pilot arrangement information. Then, the CQI generating unit 290 selects CQI from the CQI computation table 320 by using the SINR of the RB in which the dedicated pilot signal is actually arranged, among the SINRs estimated assuming that the dedicated pilot signal is in all the RBs acquired by the channel estimating unit 260. The CQI generating unit 290 then determines all the selected CQIs as feedback information and outputs the result to the code modulation unit 300.

As described above, according to the second embodiment, the base station 30 generates a dedicated pilot signal inherent in the self-station, assigns a radio resource to the dedicated pilot signal on the basis of CQI for each mobile device that is a transmission destination, and transmits the assigned dedicated pilot signal to each the mobile device that is a transmission destination. At this time, the base station 30 generates dedicated pilot assignment information indicative of the RB to which the dedicated pilot signal is assigned, and transmits the assignment information to the mobile device that is a transmission destination. Then, the mobile device 40 receives the dedicated pilot signal and the dedicated pilot assignment information, and estimates CQIs that indicate reception environments when the self-device receives data on the basis of the dedicated pilot signal superimposed on the RB to which the dedicated pilot signal is assigned. The mobile device 40 then transmits each the estimated CQI to the base station 30.

In this way, because the mobile device 40 can acquire dedicated pilot assignment information from the base station 30, the mobile device 40 can know the dedicated pilot signal to which a radio resource is actually assigned and thus may not generate CQI by using the dedicated pilot signal that is not actually assigned. Therefore, the mobile device 40 can remove the waste of the generation of CQI and further can reduce power consumption.

[c] Third Embodiment

Meanwhile, in the first and second embodiments, it has been explained about the case where the mobile device generates CQI by using a dedicated pilot signal for the other device even if beam forming is not applied to the base station. In the present invention, when beam forming is applied to the base station, the assignment of a radio resource can be more effectively performed.

Figure 24:
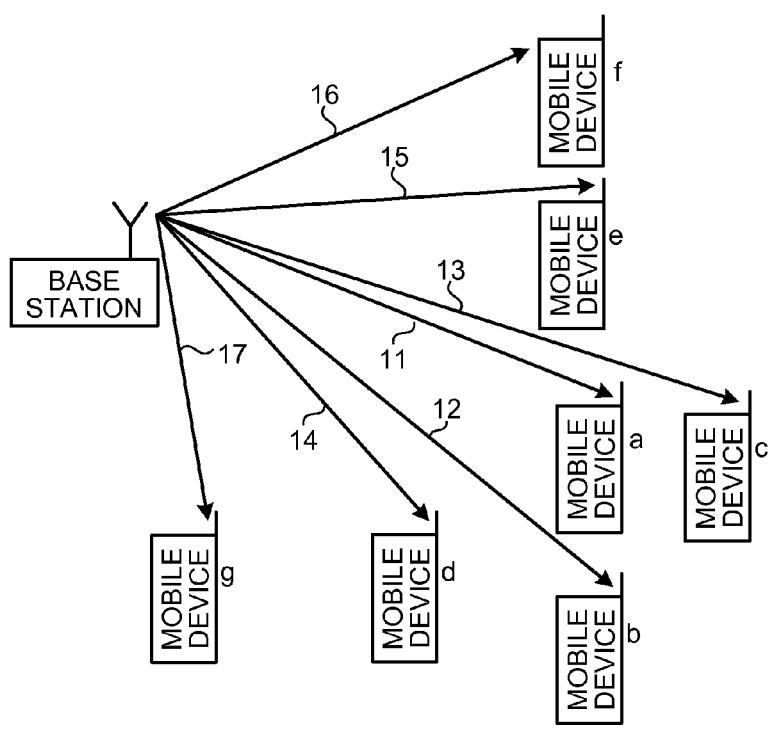
FIG. 24 is a diagram illustrating directional beams between the base station and the mobile device.

In the third embodiment, it will be explained about the case where the mobile device generates CQI by using a dedicated pilot signal for the other device when beam forming is applied to the base station. First, it will be explained about the transmission when beam forming is applied to the base station with reference to FIGS. 24 and 25. FIG. 24 is a diagram illustrating a base station, a mobile device, and a directional beam. As illustrated in FIG. 24, the base station transmits directional beams 11 to 17 that have directivity inherent in mobile devices to a plurality of mobile devices a to g. The directional beams 11 to 17 are transmitted from the base station to the mobile devices to have predetermined angles around the direction of the mobile device.

Figure 25:
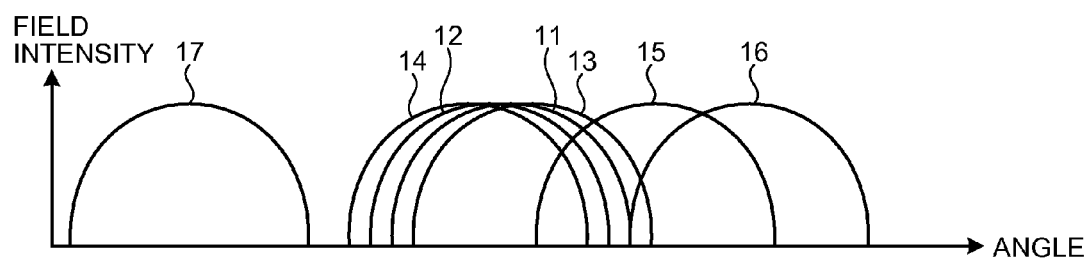
FIG. 25 is a diagram illustrating a directional beam and an angle distribution.

FIG. 25 is a diagram illustrating a directional beam and an angle distribution. As illustrated in FIG. 25, an X-axis indicates an angle and a Y-axis indicates field intensity. FIG. 25 illustrates an arrival angle of a directional beam and field intensity for each angle for each the directional beam 11 to 17 assuming that a predetermined direction from the base station is zero degree. The directional beams 11 to 14 have a large value in portions in which angles from the base station are overlapped. As a result, when the mobile device "a" receives the directional beams 11 to 14, for example, the mobile device "a" generates CQI having high reception quality because the field intensity is high.

Figure 26:
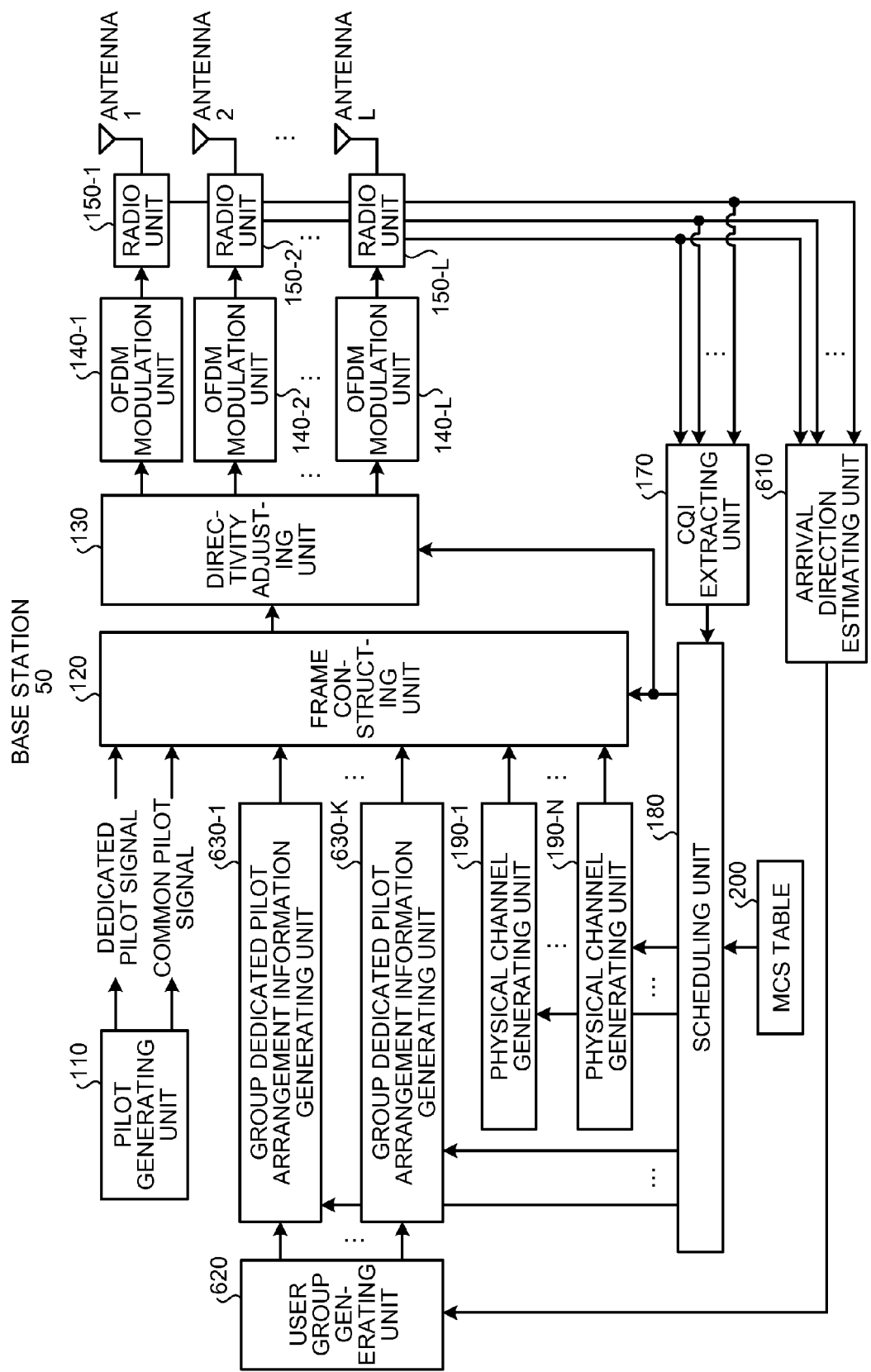
FIG. 26 is a functional block diagram illustrating the entire configuration of a base station according to a third embodiment.

Next, it will be explained about the entire configuration of a base station according to the third embodiment with reference to FIG. 26. As illustrated in FIG. 26, the base station according to the third embodiment does not include the radio unit 160 of the base station 10 (FIG. 1) according to the first embodiment but further includes an arrival direction estimating unit 610 and a user group generating unit 620, and group dedicated pilot arrangement information generating units 630-1 to 630-k. Moreover, the same units of FIG. 26 as those of FIG. 1 have the same reference numbers, and their specific descriptions are omitted.

The arrival direction estimating unit 610 estimates the arrival direction of feedback information that is transmitted from each the mobile device. For example, the arrival direction estimating unit 610 estimates, as an arrival direction, the direction in which the field intensity of the signal transmitted from the mobile device is the largest. The arrival direction estimating unit 610 then outputs the estimation result of the arrival direction for each the mobile device to the user group generating unit 620.

Figures 27, 28:
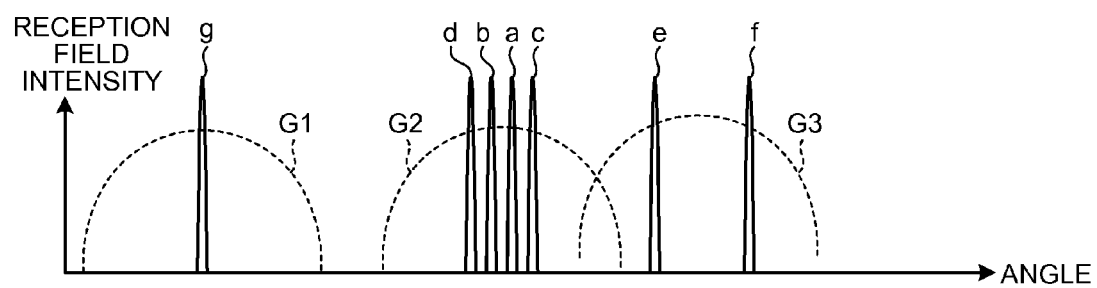
FIG. 27 is a diagram illustrating an arrival direction estimation result and a group.
FIG. 28 is a diagram illustrating an example configuration of dedicated pilot arrangement information of a group g.

When the arrival direction estimation result for each the mobile device is acquired from the arrival direction estimating unit 610, the user group generating unit 620 groups the mobile devices closed to the direction from the arrival direction estimation result for each the mobile device. Specifically, the user group generating unit 620 defines a predetermined direction from a base station 50 as zero degree, and defines mobile devices belonging to a constant angle range as one group. For example, it will be explained about a result obtained by generating a group from the arrival direction estimation result with reference to FIG. 27. FIG. 27 is a diagram illustrating an arrival direction estimation result and a group. As illustrated in FIG. 27, an angle at which the field intensities of the mobile devices a to f is the largest is illustrated. The angle is an arrival direction for each the mobile device. In the example of FIG. 27, because the mobile devices a to d belong to a constant angle range, the mobile devices constructs one group G2. Similarly, the mobile devices e to f constructs one group G3. Because the mobile device "g" is only one mobile device in a constant angle range, the mobile device constructs a single group G1. Then, the user group generating unit 620 outputs information for mobile devices belonging to a group for each the constructed group to the group dedicated pilot arrangement information generating units 630-1 to 630-k.

When RB in which a dedicated pilot signal is arranged and a pair of information of the mobile devices of RB are acquired from the scheduling unit 180, the group dedicated pilot arrangement information generating units 630-1 to 630-k generate group dedicated pilot arrangement information that indicates whether a dedicated pilot signal is arranged for each RB for mobile devices belonging to a group. Now, it will be explained about the group dedicated pilot arrangement information with reference to FIG. 28. As illustrated in FIG. 28, in the group dedicated pilot arrangement information, whether a dedicated pilot signal(VP) for the mobile devices belonging to the group(g) is arranged in the RB corresponding to a number indicated in ascending order of frequency bands from "1" is indicated by N bits for all the RBs (N pieces in FIG. 28). For example, "1" is set when a dedicated pilot signal is arranged in one RB and "0" is set when a dedicated pilot signal is not arranged in one RB.

The pilot generating unit 110 generates a dedicated pilot signal and a common pilot signal by using a cell identification number inherent in the base station. Moreover, the pilot generating unit 110 may generate a dedicated pilot signal common to mobile devices belonging to a group. In this case, a dedicated pilot signal is generated by, for example, a pseudo-random sequence that is initialized by using a group number uniquely indicated in a group. In this way, generating a dedicated pilot signal by using a series inherent in a group or a series inherent in a cell using a cell identification number instead of a series inherent in a specific user is useful because a pilot signal for the other mobile device can be also received. If a series is temporarily generated by an identification number or the like inherent in the mobile device, it is available to inform each the mobile device of additional control information on the identification number of the other mobile device to be received.

The scheduling unit 180 determines whether PDSCH for each the mobile device is transmitted every subframe. Moreover, the scheduling unit 180 determines one RB or RBs in one subframe with respect to the PDSCH for the mobile device to be transmitted. At this time, the scheduling unit 180 arranges a dedicated pilot signal in the determined RB. Moreover, the scheduling unit 180 may change the presence or absence of the arrangement of a dedicated pilot signal arranged in RB for each the mobile device. Then, the scheduling unit 180 outputs RB in which a dedicated pilot signal is arranged and a pair of information for the mobile devices of RB to the group dedicated pilot arrangement information generating units 630-1 to 630-k.

The frame constructing unit 120 acquires the arrangement information of PDSCH for the mobile devices that constitutes a subframe from the scheduling unit 180. Moreover, the frame constructing unit 120 acquires dedicated pilot arrangement information for each group from the group dedicated pilot arrangement information generating units 630-1 to 630-k. Then, the frame constructing unit 120 generates control information that includes a group to which the mobile devices belong and group dedicated pilot arrangement information for each group. Then, the frame constructing unit 120 assigns control information superimposed on PDCCH, transmission data superimposed on PDSCH, a common pilot signal, and a dedicated pilot signal to the radio resource that is configured from the plurality of frequency bands and the plurality of symbols, on the basis of the arrangement information of PDSCH for each the mobile device. The frame constructing unit 120 then outputs the assigned assignment data to the directivity adjusting unit 130.

Next, because the entire configuration of the mobile device according to the third embodiment is similar to the entire configuration of the mobile device according to the second embodiment except the dedicated pilot arrangement information receiving unit 510, their specific descriptions are omitted.

Upon acquiring the plurality of frequency components from the OFDM demodulation unit 220, the dedicated pilot arrangement information receiving unit 510 extracts, from the acquired frequency components, a group to which the self-device superimposed on PDCCH belongs and group dedicated pilot arrangement information that corresponds to the group to which the self-device belongs. The dedicated pilot arrangement information receiving unit 510 then outputs the extracted dedicated pilot arrangement information to the CQI generating unit 290.

Figure 29:
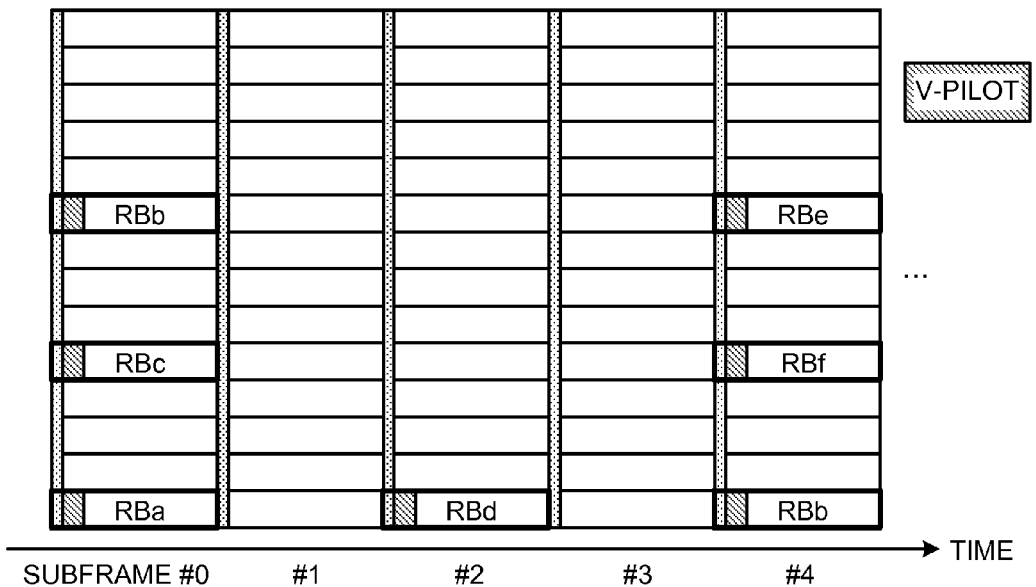
FIG. 29 is a diagram illustrating an example of RB transmitted to mobile devices a to f.

Next, it will be explained about an example of a transmission state of the radio communication system according to the third embodiment with reference to FIG. 29. FIG. 29 is a diagram illustrating RBs that are transmitted by the base station to the mobile devices a to f. Herein, RBs a to f indicate RBs that are transmitted by PDSCH of the mobile devices a to f to which beam forming is applied. The mobile devices a to d belong to the same group and the mobile devices e to f belong to the same group. As illustrated in FIG. 29, the RBs a to c transmitted to the mobile devices a to c are assigned to the subframe #0, and dedicated pilot signals are arranged in the RBs a to c. Moreover, the RBd transmitted to the mobile device "d" is assigned to the subframe #2, and a dedicated pilot signal is arranged in the RBd. Herein, the mobile devices a to d belong to the same group when focusing attention on the RBa transmitted to the mobile device "a". Therefore, when the mobile devices a to d generate CQIs on the basis of the dedicated pilot signal that is arranged in the RBa, all the generated CQIs have high reception environment. As a result, when the CQIs are fed back from the mobile devices a to f, it is effective that the base station next assigns the RB corresponding to the RBa to the mobile devices a to d. In the example of FIG. 29, in the subframe #4, the RBb transmitted to the mobile device "b" is arranged in the RB corresponding to the RBa. In this case, there is a general delay until the base station reflects the CQIs fed back from the mobile devices on the next assignment. However, it is assumed that it is four subframes in the example of FIG. 29.

As a result, when mobile devices thickly exist in a specific region, the mobile device generates CQI and feeds back the CQI to the base station by using the dedicated pilot signal for the mobile devices belonging to the same group because the mobile device is close to the direction from the base station. Therefore, the base station can effectively assign the next radio resource by using the fed back CQIs.

As described above, according to the third embodiment of the present invention, the base station 50 generates a dedicated pilot signal common to mobile devices belonging to a group, assigns the dedicated pilot signal to a radio resource on the basis of CQI for each mobile device belonging to the group, and transmits the assigned dedicated pilot signal to have directivity for each the mobile device belonging to the group. At this time, the base station 50 generates group dedicated pilot assignment information indicative of the RB to which a dedicated pilot signal is assigned for each group, and transmits the assignment information to have directivity for each the mobile device belonging to the group. Then, the mobile device 40 receives the dedicated pilot signal and the dedicated pilot assignment information for each group, and estimates CQIs indicative of a reception environment when the self-device receives data on the basis of the dedicated pilot signal superimposed on the RB to which a dedicated pilot signal is assigned for each group. Then, the mobile device 40 transmits each the estimated CQI to the base station 50.

In this way, when the mobile device 40 is close to the direction from the base station 50, the mobile device 40 generates CQIs by using the dedicated pilot signal for the mobile devices belonging to the same group and feeds back the CQIs to the base station 50. Therefore, the base station 50 can effectively assign the next radio resource by using the fed back CQIs.

All or a part of each processing function that is performed by the radio communication system may be realized by a program that is analyzed and executed by CPU (Central Processing Unit) or may be realized by hardware by a wired logic.

As described above, according to an aspect of the present invention, the device, the channel quality estimation method, and the transmission method can contribute to the optimization of assignment of a radio resource.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A first device comprising:
a receiver that preliminarily receives dedicated pilot assignment information on a resource used for a second device, and receives a dedicated pilot signal included in a dedicated pilot signal part of a data unit that is transmitted from a transmitting device to the first device based on the dedicated pilot assignment information, and receives a dedicated pilot signal included in the dedicated pilot signal part of the data unit that is transmitted from the transmitting device to the second device based on the dedicated pilot assignment information;
a processor that estimates a channel quality indicator that indicates a reception environment when the first device receives data, based on the dedicated pilot signal transmitted to the first device and the dedicated pilot signal included in the dedicated pilot signal part for the second device received by the receiver; and
a transmitter that transmits the channel quality indicator estimated by the processor to the transmitting device;
wherein the receiver further receives a common pilot signal that is transmitted from the transmitting device to have directivity that is not dynamically changed, and
the processor estimates the channel quality indicator based on the dedicated pilot signal transmitted to the first device and the signal included in the dedicated pilot signal part of the data unit transmitted to the second device received by the receiver, and estimates the channel quality indicator based on the common pilot signal received by the receiver.

2. The first device according to claim 1, wherein
the receiver preliminarily receives dedicated pilot assignment information on a resource used for data unit transmission including the dedicated pilot signal in a dedicated pilot signal part among a plurality of resources used for the data unit transmission for the second device, and the processor estimates the channel quality indicator based on the dedicated pilot signal assigned to a radio resource indicated by the dedicated pilot assignment information received by the receiver.

3. The first device according to claim 1, wherein
the receiver receives a dedicated pilot signal that is transmitted to have directivity from the transmitting device toward the first device, and the dedicated pilot signal that is transmitted to have directivity from the transmitting device toward the second device.

4. The first device according to claim 1, wherein the transmitter transmits the channel quality indicator and the channel quality indicator estimated by the processor to the transmitting device.

5. The first device according to claim 1, wherein the processor compares the channel quality indicator estimated based on the dedicated pilot signal and the channel quality indicator estimated based on the common pilot signal, and selects a large one of the channel quality indicators according to a result of the comparison, and
the transmitter transmits the result of the comparison and the selected channel quality indicator.

6. A transmitting device comprising:
a processor that generates a plurality of dedicated pilot signals that are mutually recognized by first and second mobile devices, assigns different resources for the mobile devices to the plurality of dedicated pilot signals based on a channel quality indicator that indicates a reception environment for each mobile device; and
a transmitter that transmits the dedicated pilot signals to which the resources are assigned by the processor to the mobile devices, and transmits control information including dedicated pilot assignment information on the resources that are assigned to the plurality of dedicated pilot signals and are used for the second mobile device to the first mobile device;
wherein the processor generates dedicated pilot assignment information that indicates a radio resource to which the dedicated pilot signal is assigned among a plurality of radio resources, and the transmitter transmits the control information including the dedicated pilot assignment information generated by the processor to the mobile device;
wherein the processor further generates groups of mobile devices located in a predetermined angle range based on a direction from the transmitting device to the mobile device, and, generates the dedicated pilot assignment information for each of the groups; and generates a dedicated pilot signal that is common to the mobile devices of the group.

7. The transmitting device according to claim 6, wherein the processor assigns different radio resources or transmission times for the mobile devices to the dedicated pilot signals based on the channel quality indicator that indicates the reception environment for each the mobile device.

8. The transmitting device according to claim 6, wherein the transmitter transmits the control information including information on radio resources and transmission times to which the plurality of dedicated pilot signals is assigned to the mobile devices.

9. A channel quality estimation method performed by a first device, comprising:
preliminary receiving dedicated pilot assignment information on a resource used for a second device;
receiving a dedicated pilot signal included in a dedicated pilot signal part of a data unit that is transmitted from a transmitting device to the first device based on the dedicated pilot assignment information;

receiving a dedicated pilot signal included in the dedicated pilot signal part of the data unit that is transmitted from the transmitting device to the second device based on the dedicated pilot assignment information;

estimating a channel quality indicator that indicates a reception environment when the first device receives data, based on the dedicated pilot signal transmitted to the first device and the dedicated pilot signal included in the dedicated pilot signal part for the second device received by the receiving; and transmitting the channel quality indicator estimated to the transmitting device;

wherein the receiving receives a common pilot signal that is transmitted from the transmitting device to have directivity that is not dynamically changed, and the estimating estimates the channel quality indicator based on the common pilot signal received.

10. A transmission method performed by a transmitting device, comprising:

generating dedicated pilot signals that are mutually recognized by first and second mobile devices;

assigning different resources for target mobile devices to the dedicated pilot signals based on a channel quality indicator that indicates a reception environment for each mobile device;

transmitting the dedicated pilot signals to which the resources are assigned to the mobile devices; and transmitting control information including dedicated pilot assignment information on the resources that are assigned to the plurality of dedicated pilot signals and are used for the second mobile device to the first mobile device;

wherein the generating generates dedicated pilot assignment information that indicates a radio resource to which the dedicated pilot signal is assigned among a plurality of radio resources; and the generating further generates groups of mobile devices located in a predetermined angle range based on a direction from the transmitting device to the mobile device, and, generates the dedicated pilot assignment information for each of the groups; and generates a dedicated pilot signal that is common to the mobile devices of the group.

11. The first device according to claim 1, wherein the receiver preliminarily receives dedicated pilot assignment information on a resource used for the second device, the dedicated pilot assignment information corresponding to groups of mobile devices located in a predetermined angle range from the transmitting device.

* * * * *